(12) United States Patent
Back et al.

(10) Patent No.: US 10,136,034 B2
(45) Date of Patent: Nov. 20, 2018

(54) VLC-BASED VIDEO FRAME SYNCHRONIZATION

(71) Applicant: TELEFONAKTIEBOLAGET LM ERICSSON (PUBL), Stockholm (SE)

(72) Inventors: Heidi-Maria Back, Helsinki (FI); Tomas Mecklin, Kyrkslätt (FI); Miljenko Opsenica, Espoo (FI); Le Wang, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/544,325

(22) PCT Filed: Jan. 23, 2015

(86) PCT No.: PCT/SE2015/050068
§ 371 (c)(1),
(2) Date: Jul. 18, 2017

(87) PCT Pub. No.: WO2016/118058
PCT Pub. Date: Jul. 28, 2016

(65) Prior Publication Data
US 2018/0035019 A1    Feb. 1, 2018

(51) Int. Cl.
*H04N 5/067*      (2006.01)
*H04N 21/242*    (2011.01)
(Continued)

(52) U.S. Cl.
CPC ......... *H04N 5/0675* (2013.01); *H04B 10/116* (2013.01); *H04B 10/516* (2013.01);
(Continued)

(58) Field of Classification Search
CPC ............ H04N 5/0675; H04N 21/4302; H04N 21/242; H04N 21/8547; H04B 10/116; H04B 10/516; H04L 7/0075
See application file for complete search history.

(56) References Cited

U.S. PATENT DOCUMENTS

| 6,317,166 B1 | 11/2001 | McCutchen |
| 7,411,604 B2 | 8/2008 | Trinkel et al. |

(Continued)

FOREIGN PATENT DOCUMENTS

| JP | 2007013786 A | 1/2007 |
| JP | 2013074466 A | 4/2013 |
| JP | 2013229799 A | 11/2013 |

OTHER PUBLICATIONS

International Search Report and Written Opinion issued in Application No. PCT/SE2015/050068 dated Mar. 19, 2015, 10 pages.
Rajagopal, N. et al.: "Visual Light Landmarks for Mobile Devices", Proceedings of the 13th International Symposium on Information Processing in Sensor Networks, Apr. 15, 2014, XP055121280, pp. 249-260.
Wang, A. et al.: "Enhancing Reliability to Boost the Throughput over Screen-Camera Links", Mobile Computing and Networking, ACM, 2 Penn Plaza, Suite 701, New York, NY, 10121-0701, USA, Sep. 7, 2014, XP058055511, pp. 41-52.
(Continued)

*Primary Examiner* — Leslie C Pascal
(74) *Attorney, Agent, or Firm* — Rothwell, Figg, Ernst & Manbeck, p.c.

(57) ABSTRACT

A VLC signal representing an alignment identifier is detected by cameras (4) of multiple user devices (1, 2, 3) filming a scene. Encoded video frames (91, 92, 93) from the user devices (1, 2, 3) are decoded and light patterns representing the captured VLC signal are identified in at least some of the video frames following decoding. The light patterns are decoded into alignment identifiers that are used
(Continued)

in order to time align video frames (91, 92, 93) from different user devices (1, 2, 3) to thereby achieve video frame synchronization of video data from multiple user devices (1, 2, 3) recording a scene. The embodiments thereby enable video frame synchronization without the need for accurate clock synchronization between the user devices (1, 2, 3) and a video synchronization system (10).

20 Claims, 14 Drawing Sheets

(51) Int. Cl.
*H04N 21/8547* (2011.01)
*H04L 7/00* (2006.01)
*H04N 21/43* (2011.01)
*H04B 10/116* (2013.01)
*H04B 10/516* (2013.01)

(52) U.S. Cl.
CPC ......... *H04L 7/0075* (2013.01); *H04N 21/242* (2013.01); *H04N 21/4302* (2013.01); *H04N 21/8547* (2013.01)

(56) References Cited

U.S. PATENT DOCUMENTS

2009/0022496 A1  1/2009  Shin et al.
2010/0209105 A1  8/2010  Shin et al.

OTHER PUBLICATIONS

Hu, W. et al.: "Strata: Layered Coding for Scalable Visual Communication", Mobile Computing and Networking, ACM, 2 Penn Plaza, Suite 701, New York, NY, 10121-0701, USA, Sep. 7, 2014, XP058055508, pp. 79-90.
Shrestha, P. et al.: "Synchronization of Multiple Video Recordings based on Still Camera Flashes", MM'06, Oct. 23-27, 2006, Santa Barbara, California, USA, 4 pages.
Murphy, Kevin: "A Brief Introduction to Graphical Models and Bayesian Networks", Graphical Models, 1998, 22 pages.
Murphy, Kevin: "An Introduction to Graphical Models", Graphical Models, May 10, 2001, 19 pages.

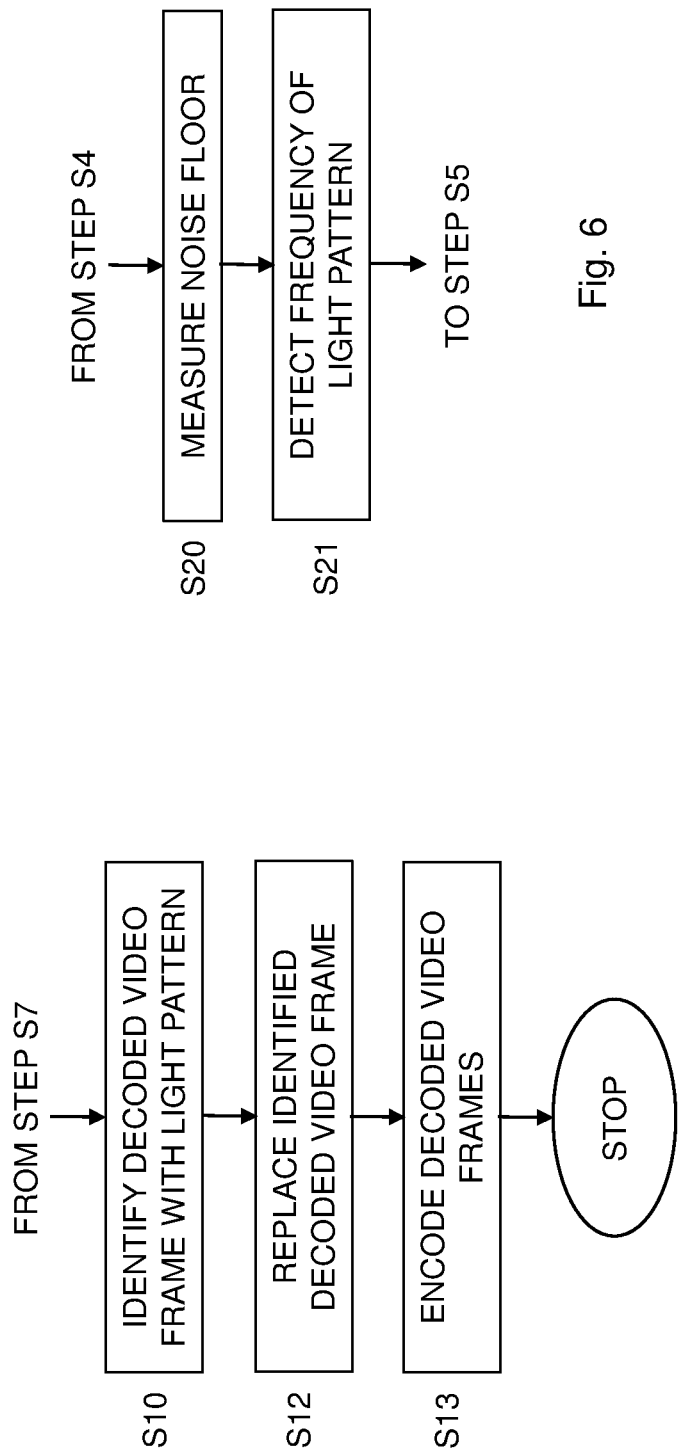

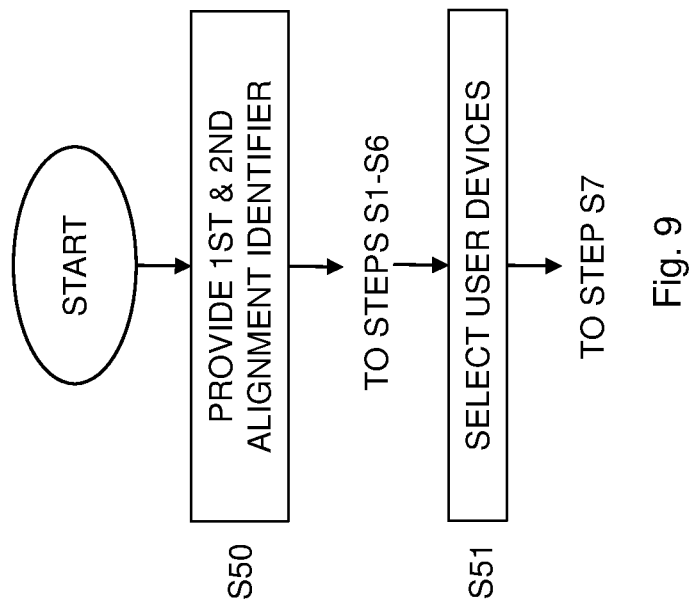

VLC-BASED VIDEO FRAME SYNCHRONIZATION

CROSS REFERENCE TO RELATED APPLICATION(S)

This application is a 35 U.S.C. § 371 National Stage of International Patent Application No. PCT/SE2015/050068, filed Jan. 23, 2015, designating the United States, which is incorporated by reference.

TECHNICAL FIELD

The present embodiments generally relate to video frame synchronization, and in particular to synchronization of video frames originating from multiple user devices recording a scene.

BACKGROUND

The advance of high-speed mobile Internet and capacity of user devices, such as mobile phones, smartphones and tablets, has given rise to a new way of consuming mobile live video streaming services. There is also a high demand from users to film a social event, e.g. a football game or a music festival in order to present the users' own version of storytelling. The emerging applications allow users to produce videos collaboratively using multiple mobile cameras in a manner similar to how professional live TV is produced. As shown in FIG. 1, the scenario includes three user roles, namely producers, directors and consumers. The producers are users with user devices 1, 2, 3 who collaboratively record and stream video feeds, for example in a stadium, to application servers or system 10. A mix of video feeds enables the directors to conduct video direction and rich-content assertion. The consumers are able to watch live broadcast of the event from different viewpoints based on the directors' selection rather than only few options provided by traditional TV broadcasting.

In a social multimedia environment, it is desirable for directors to monitor synchronized bitstreams from the producers. Simply simultaneously sending each bitstream to its physical output hardware will not necessarily ensure synchronization. In professional live video production, the synchronization among multiple camera feeds is done by specialized hardware. However, this approach is not practical when streaming video from user devices 1, 2, 3 via wireless connections. The reason being that delay is an inherent feature of wireless networks and network congestion often happens when the volume of data traffic goes up. This implies that each user device 1, 2, 3 experiences different network delays, which may further vary for a given user device 1, 2, 3 over time. As a consequence, the differences and variations in network delay cause the arrival time of each video stream at the system 10 to be different. The divergence in arrival time has great impact on the perceived video frames resulting in asynchrony in the live feeds presented to the directors. This means that the directors will not be able to edit the multiple bitstreams in a synchronized manner. As shown in FIG. 2 illustrating bitstreams or video streams 81, 82, 83 from user devices 1, 2, 3, the marked video frames 91, 92, 93 are taken by the cameras of the user devices 1, 2, 3 at the same time. Due to network delay, the time when the marked video frames 91, 92, 93 arrive at the system 10 is different. Thus, one of the most import requirements of social video streaming is adequate synchronization so that each video stream is aligned to each other. The multi-producer video filming turns out to be a problem of asynchrony, which has to be solved.

Various techniques for achieving synchronization among video streams have been proposed in the art.

In a solution clock synchronization is used. Synchronization offsets are calculated using timestamps generated by the cameras' internal clocks on the user devices. This solution is one of the most processing efficient methods. However, some user devices do not have an internal high-resolution clock. Thus, clock drift and skew may cause the user devices out of synchronization. In addition, the solution requires all the user devices to synchronize with a centralized Network Time Protocol (NTP) server. The transmission delay between each user device and the system would also vary from each other, especially when wireless network is highly congested.

In another solution audio fingerprints are extracted from audio streams and compared to find a match among all the audio streams when multiple cameras are recording the same event. By comparing the occurrence of similar sound matches, it may be possible to calculate the synchronization offset. However, this solution requires all the user devices to be close enough to the event since the speed of sound is much slower than the speed of light. The sound, recorded by a user device that is closer to the sound source, could be up to one second ahead as compared to the sound recorded by another user device, when watching a sport game in a large stadium. Furthermore, the noise generated by the crowds would also decrease the accuracy of finding suitable audio fingerprints. This means that audio fingerprinting will generally not be very reliable to achieve video frame synchronization involving multiple user devices.

In a further solution external hardware synchronized cameras or so-called inter-camera synchronization is assumed. Such a solution requires physically connecting the cameras of the user devices to external synchronization hardware. It is often used in professional live video production. However, in the social video streaming scenario, synchronizing all users' user devices in a social event is not practical and nearly impossible.

In yet another solution timestamps are added to the video streams by having new features implemented in base stations in cellular or mobile communication networks. However, a problem is that not all user devices are connected to the Internet with the same network provider, and some of them may be connected via Wireless Local Area Network (WLAN) provided by the event organizer. In order to overcome such a problem, this solution has to access each base station and WLAN access provider, which introduces complicated management issues in heterogeneous networks and increases corresponding cost.

A further solution involves analyzing the incoming video streams, and monitoring the sequence of video frames for the occurrence of at least one of a plurality of different types of visual events. The occurrence of a selected visual event should be detected among all the video streams and taken as a marker to synchronize all video streams. However, this solution requires all user devices recording at least one common visual event in order to find the marker among all the video streams from each user device. If the user devices are focusing on different parts of the event, there is no way for this solution to identify the marker.

U.S. Pat. No. 6,317,166 discloses a synchronization frame generator that is used for creating simultaneous easily visible synchronization markers as part of a multi-channel image generating system. A simple detection circuit can be used to detect the unique synchronization frames during payback of any recording made from a multi-camera system.

There is therefore a need for an efficient solution to achieve synchronization of bitstreams originating from different user devices.

SUMMARY

It is a general objective to achieve video synchronization of video streams originating from different user devices.

This and other objectives are met by embodiments as disclosed herein.

An aspect of the embodiments relates to a video synchronization method comprising modulating an alignment identifier with a modulation signal to get a light control signal. The method also comprises outputting the light control signal to a light controller connected to a visible light communication (VLC) capable light source. The light controller is configured to control the VLC-capable light source according to the light control signal to output a VLC signal. The method further comprises receiving, from each user device of multiple user devices, a bitstream of encoded video frames representing video data captured by a camera of or connected to the user device. The method additionally comprises decoding encoded video frames of the bitstream for each user device of the multiple user devices to get a stream of decoded video frames. The method also comprises identifying, for each user device of the multiple user devices and in at least one decoded video frame of the stream of decoded video frames, a light pattern representing a VLC signal captured by the camera of or connected to the user device. The method further comprises decoding the light pattern for each user device of the multiple user devices into an alignment identifier. The method additionally comprises time aligning video frames from different user devices among the multiple user devices based on the alignment identifiers.

Another aspect of the embodiments relates to a video synchronization system. The video synchronization system is configured to modulate an alignment identifier with a modulation signal to get a light control signal. The video synchronization system is also configured to output the light control signal to a light controller connected to a VLC-capable light source and configured to control the VLC-capable light source according to the light control signal to output a VLC signal. The video synchronization system is further configured to receive, from each user device of multiple user devices, a bitstream of encoded video frames representing video data captured by a camera of or connected to the user device. The video synchronization system is additionally configured to decode, for each user device of the multiple user devices, encoded video frames of the bitstream to get a stream of decoded video frames. The video synchronization system is also configured to identify, for each user device of the multiple user devices and in at least one decoded video frame, a light pattern representing a VLC signal captured by the camera of or connected to the user device. The video synchronization system is further configured to decode, for each user device of the multiple user devices, the light pattern into an alignment identifier. The video synchronization system is additionally configured to time align video frames from different user devices among the multiple user devices based on the alignment identifiers.

A further aspect of the embodiments relates to a video synchronization system comprising a modulator for modulating an alignment identifier with a modulation signal to get a light control signal. The video synchronization system also comprises an output unit for outputting the light control signal for transmission to a light controller connected to a VLC-capable light source and configured to control the VLC-capable light source according to the light control signal to output a VLC signal. The video synchronization system further comprises a frame decoder for decoding, for each user device of multiple user devices, encoded video frames of a bitstream received from the user device to get a stream of decoded video frames. The bitstream comprises encoded video frames representing video data captured by a camera of or connected to the user device. The video synchronization system additionally comprises a pattern identifier for identifying, for each user device of the multiple user devices and in at least one decoded video frame, a light pattern representing a VLC signal captured by the camera of or connected to the user device. The video synchronization system also comprises a pattern decoder for decoding, for each user device of the multiple user devices, the light pattern into an alignment identifier. The video synchronization system further comprises a time aligner for time aligning video frames from different user devices among the multiple user devices based on the alignment identifiers.

Yet another aspect of the embodiments relates to a computer program comprising instructions, which when executed by a processor, cause the processor to modulate an alignment identifier with a modulation signal to get a light control signal. The processor is also caused to output the light control signal for transmission to a light controller connected to a VLC-capable light source and configured to control the VLC-capable light source according to the light control signal to output a VLC signal. The processor is further caused to decode, for each user device of multiple user devices, encoded video frames of a bitstream received from the user device to get a stream of decoded video frames. The bitstream comprises encoded video frames representing video data captured by a camera of or connected to the user device. The processor is additionally caused to identify, for each user device of the multiple user devices and in at least one decoded video frame, a light pattern representing a VLC signal captured by the camera of or connected to the user device. The processor is also caused to decode, for each user device of the multiple user devices, the light pattern into an alignment identifier. The processor is further caused to time align video frames from different user devices among the multiple user devices based on the alignment identifiers.

A related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments address problems that video frames originating from different user devices recording a scene are out-of-synchronization, for instance, in social media environments. The embodiments achieve a reliable and implementation friendly, i.e. low complexity, solution to synchronize video stream from multiple user devices.

BRIEF DESCRIPTION OF THE DRAWINGS

The embodiments, together with further objects and advantages thereof, may best be understood by making reference to the following description taken together with the accompanying drawings, in which:

FIG. 5 is a flow chart illustrating additional, optional steps of the video synchronization method shown in FIG. 3;

FIG. 6 is a flow chart illustrating additional, optional steps of the video synchronization method shown in FIG. 3;

FIG. 7 is a flow chart illustrating additional, optional steps of the video synchronization method shown in FIG. 3;

FIG. 8 is a flow chart illustrating additional, optional steps of the video synchronization method shown in FIG. 3;

FIG. 9 is a flow chart illustrating additional, optional steps of the video synchronization method shown in FIG. 3;

DETAILED DESCRIPTION

Throughout the drawings, the same reference numbers are used for similar or corresponding elements.

The present embodiments generally relate to video frame synchronization, and in particular to synchronization of video frames originating from multiple user devices recording a scene.

The embodiments thereby enable video frame synchronization for video streaming of multiple user devices, for instance, in connection with a social event, such as a game or concert. As a consequence of the video frame synchronization it is possible to conduct video direction and rich-content assertion by providing video of the event from different viewpoints corresponding to the users' positions relative to the recorded scene.

The video frame synchronization of the embodiments is even able to synchronize video frames originating from user devices that may belong to and are thereby connected to different access networks. Thus, such video frame synchronization is possible even if some of the user devices are connected to a first access network, such as one or more cellular or mobile communication networks, whereas other user devices are connected to a second access network, such as a WLAN.

The user device is preferably in the form of a mobile or portable user device, such a mobile telephone, a smartphone, a tablet, a laptop, a video camera with wireless communication circuitry, etc.

In the following, a video frame is used to denote a picture or image of a video stream. Hence, a video frame could alternatively be denoted (video) picture or (video) image in the art. As is known in the art of video coding, a video frame is encoded according to a video coding standard to get an encoded video frame, such as an intra-coded frame, or I frame or picture, or an inter-coded frame, or P or B frame or picture.

Figure 3:
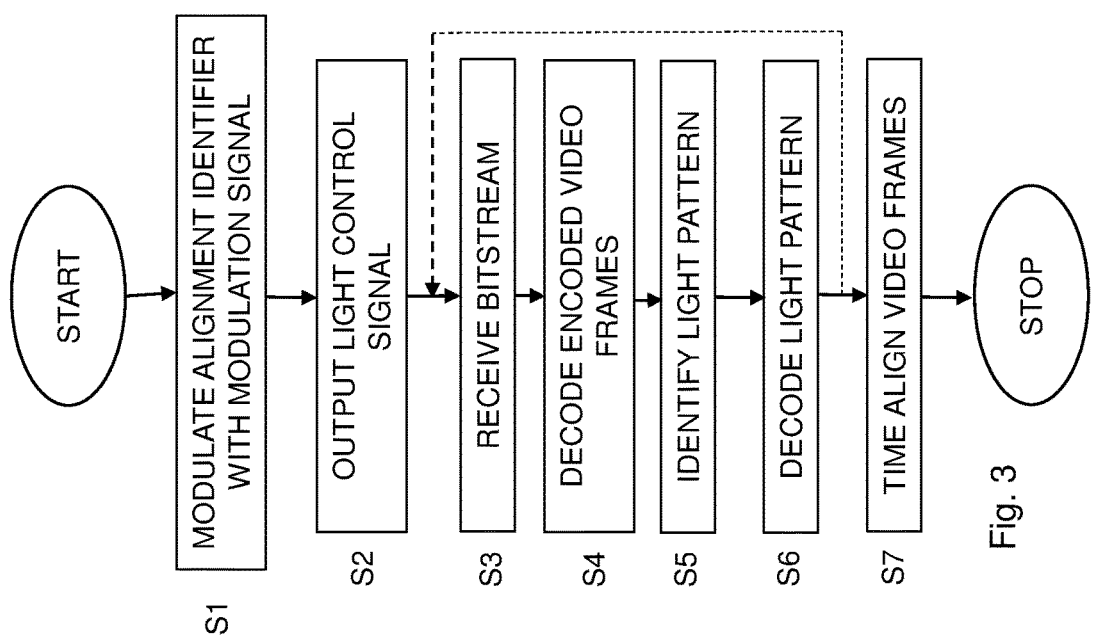
FIG. 3 is a flow chart illustrating a video synchronization method according to an embodiment.

FIG. 3 is a flow chart illustrating a video synchronization method according to an embodiment. The steps S3 to S6 as shown in the figure are performed for each user device of multiple, i.e. at least two, user devices, which is schematically indicated by the hatched line. The method starts in step S1, which comprises modulating an alignment identifier with a modulation signal to get a light control signal. The light control signal is output in step S2 to a light controller connected to a visible light communication (VLC) capable light source. The light controller is configured to control the VLC-capable light source according to the light control signal to output a VLC signal. The following step S3 comprises receiving, from each user device of the multiple user devices, a bitstream of encoded video frames representing video data captured by a camera of or connected to the user device. Encoded video frames of the bitstream are decoded in step S4 for each user device of the multiple user devices to get a stream of decoded video frames. Step S5 comprises identifying, for each user device of the multiple user devices and in at least one decoded video frame of the stream of decoded video frames, a light pattern representing a VLC signal captured by the camera of or connected to the user device. The light pattern is decoded in step S6 for each user device of the multiple user devices into an alignment identifier. Finally, step S7 comprises time aligning video frames from different user devices among the multiple user devices based on the alignment identifiers.

The video synchronization method is thereby based on generating a light control signal that is used to control or drive a VLC-capable light source in order to output a VLC signal that is detectable by the cameras of or connected to the user devices. Hence, the cameras will capture the VLC signal while they are recording a scene. The cameras will thereby output at least one video frame comprising a light pattern representing the captured VLC signal. The video frames generated by the cameras are encoded into respective bitstreams that are received and decoded. Respective decoded video frames comprising the light pattern are identified and the light patterns are decoded to get respective alignment identifiers. The alignment identifiers can then be used in order to time align video frames from the different user devices. This is possible since video frames comprising a light pattern that give rise to the same alignment identifier following decoding of the light pattern are recorded at the same point in time at the different user devices. Hence, these video frames could be used as time or synchronization anchors by time aligning video frames from respective user device so that the identified video frames comprising the light pattern are time aligned and thereby have the same output or playback time.

In an embodiment, step S7 thereby comprises time aligning the video frames from the different user devices based on respective values of the alignment identifiers. In particular, video frames comprising light patterns that result in the same or corresponding value of the alignment identifier should be time aligned so that they have a same output or playback time.

In a particular embodiment, step S7 comprises assigning a same output or playback identifier value to video frames from the different user devices having the same or corresponding value of the alignment identifier. Alternatively, or in addition, step S7 comprises assigning output or playback identifier values to video frames from the different user devices so that video frames from the different user devices having the same or corresponding value of the alignment identifier would be assigned the same output or playback identifier value.

In the first case, output or playback identifiers are assigned to the identified video frames comprising the light patterns and preferably also to other video frames following these identified video frames in playback or output order. In the latter case, such output or playback identifiers do not necessarily have to be assigned to the identified video frames but are assigned to other video frames following these identified video frames in playback or output order. The reason being that it is possible to remove the identified video frames from the respective streams since the light pattern may cause noise or distortion that result in visually annoying effects to the viewer. In such a case, it is not absolutely necessary, but indeed possible, to assign output or playback identifiers to these identified video frames since they will be removed. However, the assignment of playback or output identifier values to other video frames of the respective streams is then performed in such a way so that video frame number k (assuming a same frame rate) in each stream following the respective identifier video frame with light pattern is assigned the same playback or output identifier value.

An example of playback or output identifier is picture order count (POC) that is commonly used to denote output order of video frames following video decoding. Output could be output for display or playback but could also mean output for storage, output for transcoding or output for some other form of processing. Actually any numbering or identifier series that represents playback or output order of video frames can be used according to the embodiments.

In another particular embodiment, step S7 comprises outputting video frames from the different user devices having the same or corresponding value of the alignment identifier at a same point in time. Hence, in this embodiment, it may not be necessary to assign playback or output identifiers to the video frames of the different streams. In clear contrast, video frames are output in such a way that video frames having the same or corresponding value of the alignment identifier are output at the same point in time. Video frames following these respective video frames are preferably furthermore output to keep the time alignment between the streams. This means that video frame number k following the video frame comprising a light pattern from which the alignment identifier is obtained in a first stream is preferably output at the same point in time as video frame number k following a video comprising a light pattern from which the alignment identifier is obtained in a second, different stream (assuming the same frame rate of the two streams).

In a typical embodiment, each video frame of the bitstreams has a respective picture or frame number. In such a case, the time alignment can be performed by matching frame numbers of selected video frames from the different user devices so that these video frames are time aligned. For instance, assume that a video frame with frame number $f_1$ from user device number 1 comprises a light pattern resulting in an alignment identifier $AD_1$, a video frame with frame number $f_2$ from user device number 2 comprises a light pattern resulting in an alignment identifier $AD_1$ and a video frame with frame number $f_3$ from user device number 3 comprises a light pattern resulting in an alignment identifier $AD_1$. The values of these alignment identifiers are then compared and if they are equal, as in the present case, it is determined that the video frames with frame number $f_1$, $f_2$ and $f_3$, respectively, should be time aligned. This can, for instance, be achieved by outputting these three video frames at the same point in time or by assigning the same value of a playback or output identifier to the these video frames.

In the above described embodiments, the values of the alignment identifiers are compared to see whether they are the same or has corresponding value. In the latter case, i.e. corresponding value, it could be possible that alignment identifiers are composed of at least two parts, such as one part that is specific for a given VLC-capable light source or light controller and one part that represents a time reference, such as in the form of a sequence number. This means that different VLC-capable light sources could be controlled to output VLC signals based on different light control signals but at the same point in time. However, decoding light patterns in video frames from user devices capturing these different VLC signals generate alignment identifiers having different parts corresponding to the light source or light controller specific part and a common part corresponding to the time reference or sequence number. In such an approach, a first alignment identifier and a second alignment identifier are regarded as having corresponding values if they have the same time reference or sequence number, i.e. have the same value of the common part, even if they may have different values for the light source or light controller specific part of the alignment identifiers. The time reference or sequence number is then an indication that the VLC signals are output at the same point in time by the different VLC-capable light sources.

The usage of different parts of an alignment identifier may be beneficial to enable determination of from which VLC-capable light source a given VLC signal has been output in addition to determining the point in time at which the VLC signal was output. This information may be used to provide spatial information or position information of the user devices having captured the respective VLC signals. Thus, a first user device capturing the VLC signal from a first VLC-capable light source is typically positioned or at least turned in a different direction relative to a scene as compared to a second user device capturing the VLC signal from a second VLC-capable light source.

The position information obtained from the respective alignment identifiers may be used when selecting which streams of video frames to mix or combine, for instance, by only mixing streams of video frames coming from user devices positioned in a defined area relative to the scene, such as determined based on the light source or light controller specific parts of the alignment identifiers.

The modulation signal used to modulate the alignment identifier in step S1 of FIG. 3 is preferably a pulse width modulation (PWM) signal. For instance, the alignment identifier can be modulated onto a standard PWM signal used to drive commercial and resident light-emitting diode (LED) lightning. The modulated signal can be generated by, for instance, a low-cost micro-controller which drives a commercially available LED light through a metal-oxide-semiconductor field-effect transistor (MOSFET) driver circuit.

The light controller then controls or drives the VLC-capable light source according to the light control signal to output a VLC signal, i.e. to flash a coded signal in lightning with high frequency on-off changes. While the cameras of or connected to the user devices record a scene, such as a social event, the VLC signals are recorded as part of the video streams. The VLC signals can then be detected in the form of a light pattern present in some of the video frames, see FIG. 13.

For instance, assume that a light controller receives a light control signal represented by $10100010_{bin}$. The light controller then controls its connected VLC-capable light source to flash in a pattern according to the light control signal, i.e. on, off, on, off, off, off, on and off in the present example.

The VLC-capable light sources are operated on high frequency with regard to the flashes caused by the light control signal. This rapid flashing is preferably imperceptible to humans, i.e. too high frequency, but is still captured by the cameras of or connected to the user devices. However, in some situations there might be a degradation in quality due to the light pattern present in some of the video frames when the cameras capture the VLC signal. In such a case, the operation of the generation of alignment signal or light control signal may be adapted as is further described herein. Alternatively, or in addition, selective processing of those video frames that comprise the light patterns can be performed as is further disclosed in FIGS. 4 and 5.

Figure 1:
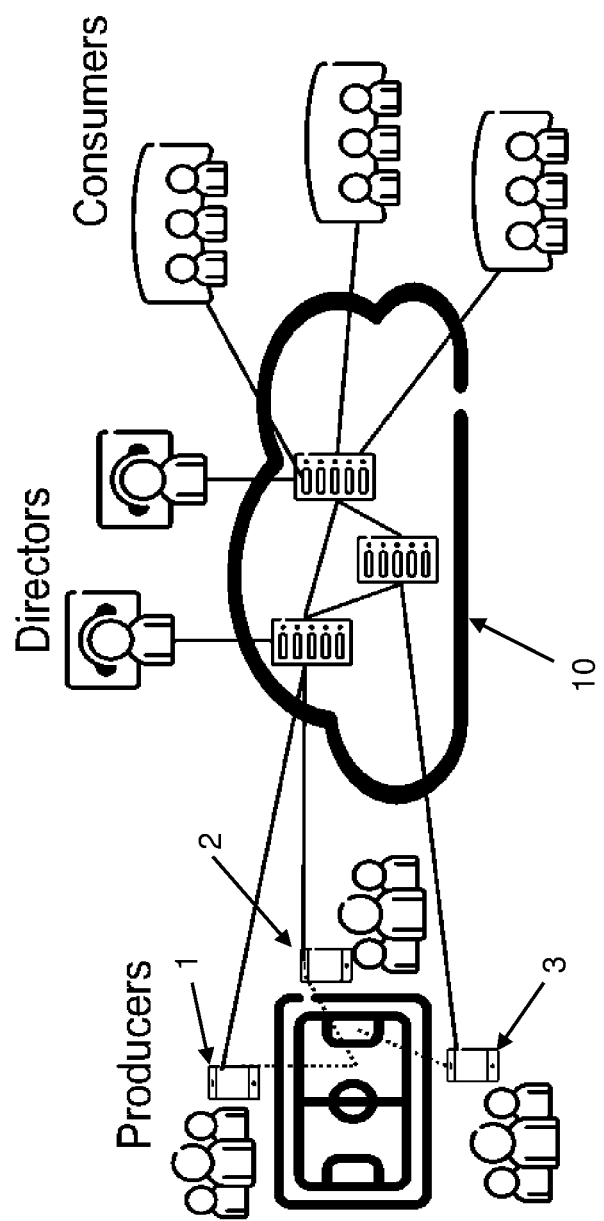
FIG. 1 illustrates social video streaming of a sports event.
Figure 2:
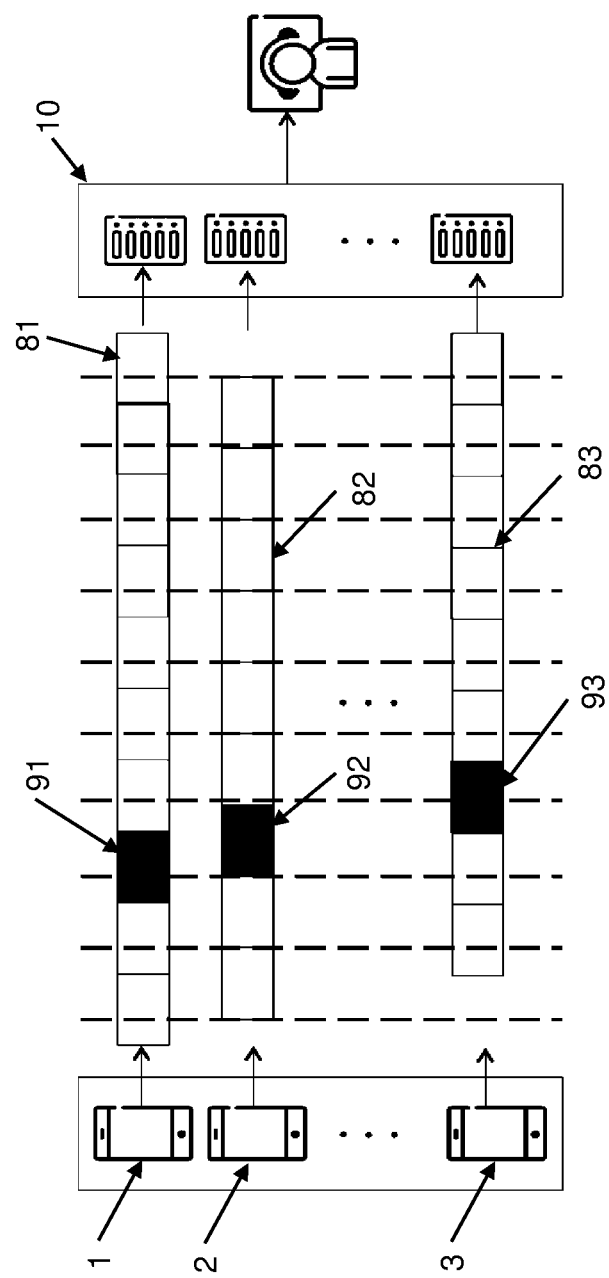
FIG. 2 schematically illustrates lack of synchronization of bitstreams sent from multiple user devices.
Figure 4:
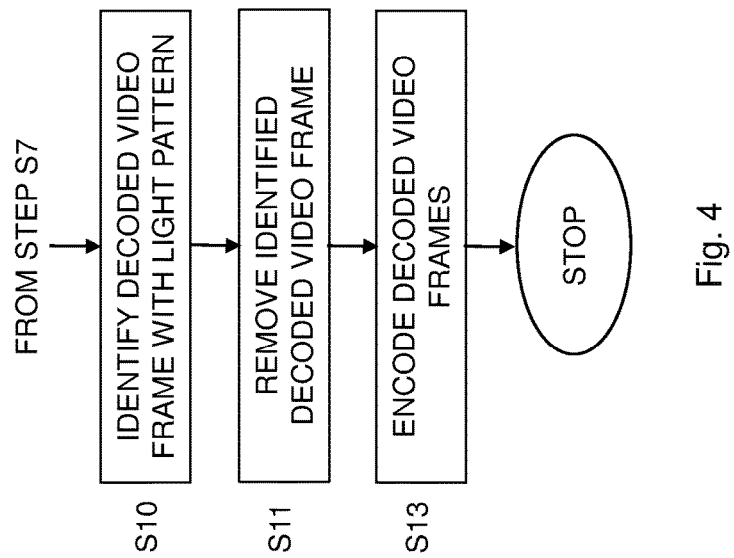
FIG. 4 is a flow chart illustrating additional, optional steps of the video synchronization method shown in FIG. 3.

FIG. 4 is a flow chart illustrating additional, optional steps of the method in FIG. 3. The method continues from step S7 in FIG. 3. A next step S10 comprises identifying at least one decoded video frame comprising the light pattern that represents the VLC signal captured by the camera of or connected to the user device. The identified at least one decoded video frame is then removed in step S11 from the stream of decoded video frames. The following step S13 comprises encoding video frames of the stream of decoded video frames into encoded video frames. The method then ends.

The operations of steps S10, S11 and S13 are preferably performed for each stream of decoded video frames that is time aligned in step S7. This means that the video frames in the respective stream that comprise the light pattern, which may degrade the quality of the video, are removed. As a consequence, in a preferred embodiment only video frames without any potentially disturbing light pattern are input to be encoded and further processed by the directors or transmitted to the consumers.

FIG. 5 is a flow chart illustrating an alternative embodiment to removing video frames. The method continues from step S7 in FIG. 3 and continues to step S10. This step S10 is performed as described above in connection with FIG. 4. A next step S12 comprises replacing the identified at least one decoded video frame with a neighboring decoded video frame lacking the light pattern of the stream of decoded video frames. The method then continues to step S13 that is performed as described above in connection with FIG. 4.

The operations of steps S10, S12 and S13 are preferably performed for each stream of decoded video frames that is time aligned in step S7.

Thus, in this embodiment a video frame comprising the potentially disturbing light pattern may be replaced with a neighboring video frame present in the same stream of decoded video frames and where this neighboring video frame does not comprise the light pattern. Neighboring video frame as used herein preferably refers to neighboring with regard to output order, which may be different from the decoding and encoding order of the video frames. Thus, if video frame number h in a given stream comprises a light pattern, then this video frame may be replaced by video frame number h−1 in the give stream, where the numbering of video frames is according to the output order.

Neighboring video frame, thus, preferably corresponds to the immediate adjacent video frame in the stream, i.e. video frame number h−1 is a neighboring video frame for video frame number h. Neighboring video frame could also correspond to video frame number h+1 or indeed h±q, wherein q is a defined integer value, preferably q=1, 2 or 3.

Generally, there is hardly no perceivable quality deterioration by replacing a video frame with a neighboring video frame in the stream.

Replacing the identified at least one video frame in step S12 can be performed according to different embodiments. For instance, the replaced video frame could be encoded according to the so-called skip mode or the merge mode of, for instance, H.264 or H.265 video coding standards using the neighboring video frame as reference frame.

FIG. 6 is a flow chart illustrating additional, optional steps of the video synchronization method. The method continues from step S4 in FIG. 3. A next step S20 comprises measuring a noise floor of transmission of the bitstream for each user device of the multiple user devices. The following step S21 comprises detecting, for each user device of the multiple user devices and based on the measurements performed in step S20, a frequency of the light pattern in the image frequency domain. The method then continues to step S5 in FIG. 3 where the light pattern is identified. In this embodiment, step S6 preferably comprises decoding the light pattern for each user device of the multiple user devices and based on information of the frequency of the light pattern.

Thus, the noise floor of each transmission from the user device is measured in order to detect the frequency of the light pattern in the image frequency domain and thereby infer the frequency of the pulsing VLC signal. Once the light pattern is found it can be decoded to get the original alignment identifier. The alignment identifiers determined from each video stream are compared and the matches are treated as markers to allow time alignment of the video streams.

In practice, a frame may contain multiple frequencies. The combination of different frequencies can represent meaningful symbols. A series of such symbols, thus, represents an alignment identifier.

More information of detecting frequency of light pattern and decoding of light pattern into an alignment identifier can be found in section IV. Visual Light Communication on pages 252-254 in Rajagopal et al., Visual Light Landmarks for Mobile Devices, IPSN '14 Proceedings of the 13th international symposium on Information processing in sensor networks, pages 249-260, the teachings of which is hereby incorporated as a reference example of how to generate an alignment identifiers and light control signals and how to detect and decode light patterns to obtain alignment identifiers.

As previously mentioned, the presence of light patterns in some of the video frames may in some cases degrade the quality of the video to some degree. In most cases, any such quality deterioration is next to unperceivable to a viewing user. However, embodiments may be used in order to monitor the quality and control and adjust modulation and/or generation of the alignment identifier if the quality is determined or estimated to be unacceptably low.

FIG. 7 is a flow chart illustrating additional, optional steps of the video synchronization method. The method continues form step S7 in FIG. 3. A next step S30 comprises obtaining a quality of service (QoS) parameter representative of a quality of transmission of the bitstream for at least one user device of the multiple user devices. The following step S31 comprises controlling modulation of the alignment identifier (ID) and/or generation of the alignment identifier based on a value of the QoS parameter.

The QoS parameter could be any parameter representative of the quality of the transmission of the bitstream of encoded video frames. Non-limiting, but illustrative, examples of QoS parameters that could be used according to the embodiments include Real-time Transport Protocol (RTP) Control Protocol (RTCP) feedback, such as receiver reports (RR) containing information about the quality of service; and video quality related parameters, such as frame rate, packet loss rate, bit rate, jitter and delay.

In the above described embodiment, the modulation and/or generation of the alignment identifier is controlled based on the obtained QoS parameter. FIG. 8 illustrates another embodiment that could be used instead of or as a complement to the QoS-parameter-based modulation and/or generation control. The method continues from step S7 in FIG. 3. A next step S40 comprises obtaining a quality score representative of a quality of video data of the bitstream for at least one user device of the multiple user devices. The next step S41 comprises controlling modulation of the alignment identifier and/or generation of the alignment identifier based on the quality score.

The quality score obtained in step S40 is more related to a human perceived quality of the video data as compared to the QoS parameter obtained in step S30. Thus, the quality score could be human feedback from the directors. This could for example be in the case of disturbances caused by the VLC signal that are noticed by the director but are not detected using the RTCP feedback. The quality score could, for instance, be in form of a mean opinion score (MOS).

The two types of quality parameters, i.e. the QoS parameter and the quality score, complement each other well. The QoS parameter is generally easier to obtain and does not require human intervention. However, there may be situations where the QoS parameter value indicates a low quality even if a human viewer would not see any deterioration in the video and the other way around.

In an embodiment, controlling modulation of the alignment identifier in step S31 or S41 comprises increasing time intervals between occasions of modulating the alignment identifier if a value of the QoS parameter represents a worse QoS than a defined minimum QoS (step S31) or if a value of the quality score represents a worse quality than a defined minimum quality (step S41).

Thus, if the quality of the video as assessed by the QoS parameter and/or quality score is too low then the time interval between occasions of modulating the alignment identifier are increased. This in turn means that the time intervals between the occasions when the light controller controls the VLC-capable light source and the VLC-capable light source outputs the VLC-signal increase. Hence, there will, for a given period of time, be fewer video frames of the bitstream that comprise light patterns and thereby fewer video frames that may lower the quality of the video.

If the quality of the video is determined to be sufficiently high with the current time intervals between occasions of modulating the alignment identifier then it could be possible to decrease the time intervals between modulation occasions. In such a case, controlling modulation in step S31 or S41 comprises decreasing time intervals between occasions of modulating the alignment identifier if a value of the QoS parameter represents a better QoS than a defined QoS (step S31) or if a value of the quality score represents a better quality than a defined quality (step S41).

This means that if the quality of the video as assessed by the QoS parameter and/or the quality score is sufficient then it could be possible to more often output VLC signals by decreasing the time intervals of modulating the alignment identifier and thereby decreasing the time intervals between controlling the VLC-capable light source and outputting the VLC signal.

In this case, it is possible to more frequently and/or with shorter delay perform time alignment of video frames originating from different user devices.

Instead of or as an alternative to increasing the time intervals between modulation occasions step S31 or S41 could comprise generating an alignment identifier resulting in a reduction of a duration of the VLC signal if a value of the QoS parameter represents a worse QoS than a defined minimum QoS or if a value of the quality score represents a worse quality than a defined minimum quality.

Thus, the alignment identifier could be designed or generated to result in VLC signals of shorter durations, i.e. shorter lengths with regard to time, and will thereby affect fewer video frames or affect a smaller portion of a video frame per stream. For instance, an alignment identifier of a given length resulting in a light control signal representing N bits would cause the light controller to flash the VLC-capable light source at N consecutive time occasions (either let the VLC-capable light source be on to represent $1_{bin}$ (or $0_{bin}$) or be off to represent $0_{bin}$ (or $1_{bin}$)). In such a case, the alignment identifier could be generated to reduce this number N to thereby reduce the total time period during which the VLC signal is output by the VLC-capable light source.

In an example embodiment, the alignment identifier comprises a preamble symbol, optionally followed by a pilot symbol and then a sequence number. The preamble symbol is used by the light controller in order to determine the start of the alignment identifier. The optional pilot symbol may be included in the alignment identifier to allow measurements of the noise floor of the VLC signal transmission. Such a pilot symbol is optional and may be omitted. The sequence number of the alignment identifier is used to define the point in time at which the VLC signal was output from the VLC-capable light source. This means that at one occasion the sequence number has a first value, whereas at another occasion the sequence number has a second, different value.

This means that the value of the alignment identifier and in particular the sequence number value that is obtained by decoding the light pattern identified in at least one decoded video frame from each user device is used as alignment or time marker to indicate that video frames carrying light patterns representing the same or corresponding alignment identifier or the same sequence number are recorded at the same period of time at the different user devices.

In another embodiment, the preamble symbol and the pilot symbol may be omitted so that the alignment identifier typically only comprise the sequence number part.

As was mentioned in the foregoing, it could be possible to use alignment identifiers with a source or controller specific part and another part that is common, for a given output occasion, for multiple VLC-capable light sources. In such a case, it could be possible to use the alignment identifier values not only to determine the point in time when a VLC signal was captured by the cameras of or connected to the user devices, based on the value of the common part, but also from which VLC-capable light source a captured VLC signal originated, based on the source or controller specific part.

In another embodiment, different alignment identifiers are used for different VLC-capable light sources. FIG. 9 is a flow chart illustrating such an embodiment. The method starts in step S50, which comprises providing a first alignment identifier and a second alignment identifier. The first alignment identifier comprises an optional preamble symbol followed by an optional pilot symbol and a first sequence number. The second alignment identifier comprises the optional preamble symbol followed by the optional pilot symbol and a second, different sequence number. The method then continues to steps S1 to S6 in FIG. 3. In this embodiment, step S1 comprises modulating the first alignment identifier with the modulation signal to get a first light control signal and modulating the second alignment identifier with the modulation signal to get a second light control signal. Step S2 preferably comprises, in this embodiment, outputting the first light control signal to a light controller connected to a first VLC-capable light source and configured to control the first VLC-capable light source to output a first VLC signal. Step S2 preferably also comprises outputting the second light control signal to a light controller connected to a second VLC-capable light source and configured to control the second VLC-capable light source according to the second light control signal to output a second VLC signal. The method continues, following steps S3 to S6, to step S51. This step S51 comprises selecting, based on the first alignment identifier and the second alignment identifier, user devices among the multiple user devices outputting bitstreams carrying at least one encoded video frame with a light pattern representing the first VLC signal. The method then continues to step S7 of FIG. 3, which preferably comprises, in this embodiment, time aligning video frames from the selected user devices.

Thus, in this embodiment, the mixing of video streams from different user devices is merely performed for a subset of the user devices and in particular for those user devices that are positioned so that they will detect and capture the first VLC signal but not the second VLC signal.

This technique makes it possible to mix video streams from different parts of an area or stadium and thereby from different users depending on their position relative to the stage or field. For instance, video streams originating from user devices positioned directly in front of a stage and thereby capturing the first VLC signal could be mixed whereas video streams originating from user devices positioned on the side relative to the stage and thereby capturing the second or further VLC signals should not be intermixed with these video streams.

This concept can of course be extended further to use more than two different alignment identifiers. Furthermore, the time alignment could be performed not only for user devices producing a bitstream carrying at least one encoded video frame with a light pattern representing the first VLC signal. In clear contrast, several parallel time alignments could be performed for the different groups of user devices depending on the values of the alignment identifiers obtained from video frames in the respective bitstreams.

In this case different VLC signals are output by different VLC-capable light sources at the same point in time. The video synchronization system preferably stores information specifying that the first alignment identifier and the second alignment identifier represent the same period in time for VLC signal transmission even if the two alignment identifiers have different sequence numbers.

There is trend of video traffic growing in the Internet and, hence, there is a trend for time synchronization as well. Such time synchronization is needed in multiple market segments, for example in the industrial Internet. WiFi Alliance is looking into this kind of use cases where devices are assumed to connect to the same access network. At the same time, as amount of user-generated video content is growing, the video synchronization will also be needed in user-generated video cases. Thus, there is need for being able to synchronize the video streams from different user devices. The difference to e.g. the use cases presented by the WiFi alliance is that normal user devices cannot be assumed to connect to the same access network.

Figure 10:
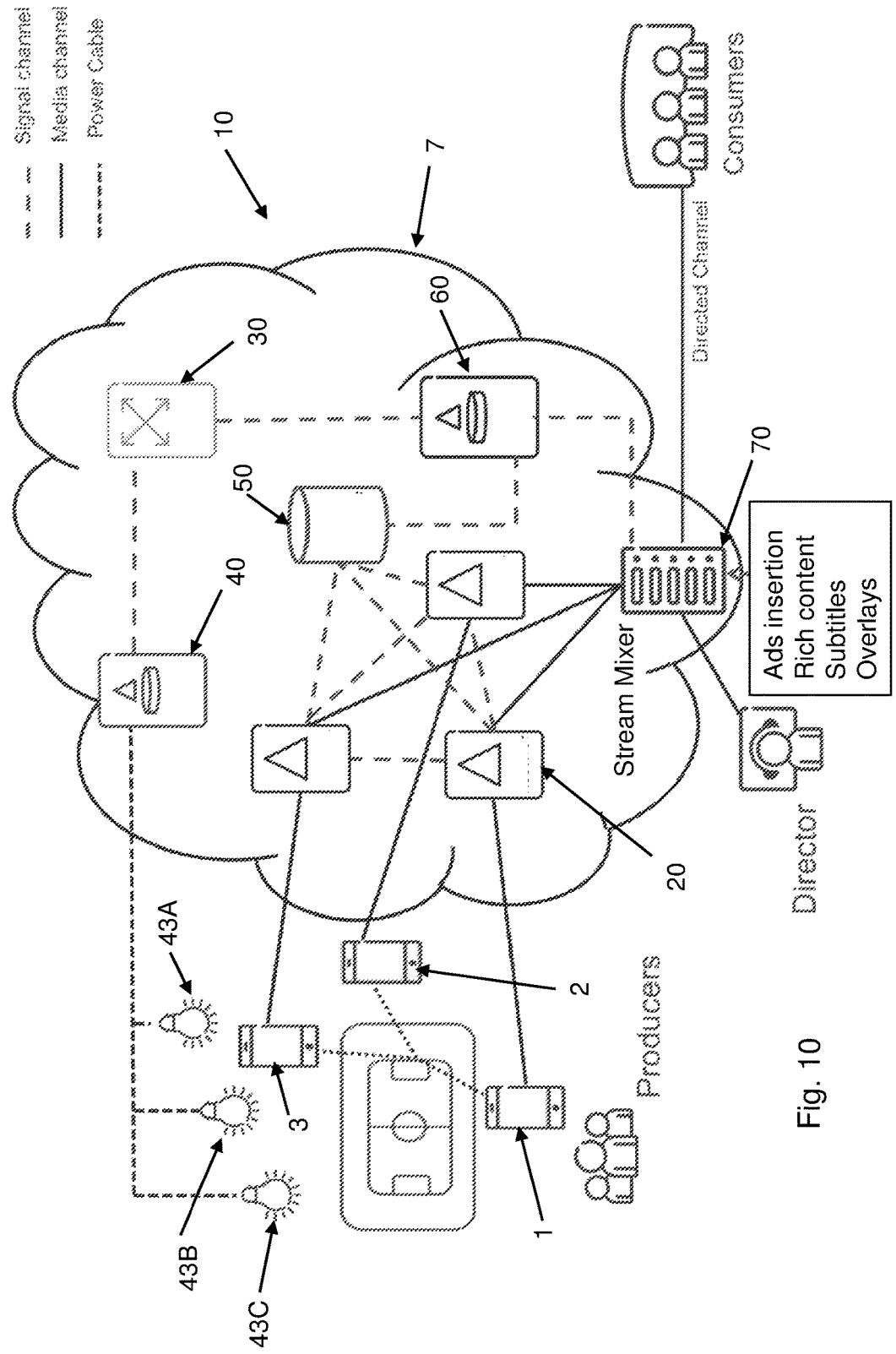
FIG. 10 schematically illustrates an overview of user devices and a video synchronization system and the operation flow in order to achieve synchronization of video frames according to an embodiment.

FIG. 10 schematically illustrates an overview of user devices 1, 2, 3 and a video synchronization system 10 and the operation flow in order to achieve synchronization of video frames according to an embodiment. As shown on the right side of FIG. 10, a light controller 30 retrieves a sequence number as an example of alignment identifier from a database 50. The sequence number is modulated by means of Pulse Width Modulation (PWM). After adding a preamble symbol to the encoded sequence number, the data packet is sent from the light controller 30 to the LED lights 43A, 43B, 43C.

Once the receiver, represented by a power module 40, in these LED lights 43A, 43B, 43C receives the data packet, the power module 40 can identify the start of each data packet by locating the preamble symbol. Then, the power module 40 flashes the LED lights 43A, 43B, 43C according to the encoding pattern. While user devices 1, 2, 3 are using their cameras to film an event, the light pulses illuminating at a frequency much higher than camera's capture time can produce bands in the images, which compose the video streams. Along with video frames, these bands are sent from the user devices 1, 2, 3 to receivers 20 of the video synchronization system 10.

Then, the receiver 20, which can be several, is able to measure the noise floor of each transmission to detect the frequency of these bands (light pattern) in the image frequency domain, and infer the frequency of the pulsing light. Once the light pattern is found, it will be decoded to the original sequence number, which was sent at the beginning of each operation cycle. The video synchronization system 10 compares the sequence numbers found from each video streams. The matches can be treated as markers to allow the video synchronization system 10 to align all the video streams and mix the video streams in a stream mixer 70.

For scalability, the receiver functionality can be distributed over several servers or entities. If the receiver functionality is distributed, the receivers 20 will need to synchronize with each other to align the video frames that are sent over to the stream mixer 70 and further to the directors. The receivers 20 are preferably connected to the same network so there is no variation in the delay in the same way as there is for the producers. The trigger to start distributing the receiver functionality could depend, for example, on the server central processing unit (CPU) load. If the CPU load gets high, the quality of the video decoding could start to decrease.

Before sending the video frames over to the director, the video synchronization system 10 may remove video frames containing the VLC information, i.e. light pattern, from the video stream. If needed, the video synchronization system 10 can add some other type of meta data into the video stream.

Depending on the accuracy the video synchronization system 10 requires and the video quality requirements, the frequency of sending the encoded sequence number can be adjusted. For this a QoS control functionality is preferably present in the video synchronization system 10. The QoS controller 60 would be analyzing the QoS parameters of the incoming video streams. The receivers 20 store QoS data of the video streams, e.g. RTCP feedback data, into the database 50 based on which the QoS controller 60 would be doing QoS analysis. If there is a need to adjust, for example, the frequency at which the LEDs 43A, 43B, 43C are flashing, the QoS controller 60 can command this over a VLC control application programming interface (API) exposed by the light controller 30. The VLC control API provides functionality to modify the frequency and to optimize the light sources 43A, 43B, 43C in other possible ways.

In addition to the automated QoS processing done at the QoS controller 60, there could be human feedback from the director. This could be for example in case there is disturbances caused by the lights that are noticed by the director, but are not detected with using the RTCP feedback only.

VLC can be used to encode complicated metadata into the video streams. Besides extracting synchronization information, the metadata allow the director to know which seat section the video streams come from, which direction the camera is facing, and so on without complicated physical object detection and recognition. The director can decide which video streams should be included in the video or frame synchronization based on his/her service's needs. It is also possible to support various kinds of filtering mechanisms. Thus, video synchronization can be done more efficiently and intelligently.

The current architecture is designed so that there is no bottleneck for video processing, which might become heavy in case the producers produce video in high quality. Also the QoS controller 60 can be distributed in such a way that each QoS controller 60 is responsible for handling the quality of a single video stream. In this way, this service could be provided as a video synchronization service based on visual light communication in the cloud.

Moreover, the light controller 30 and power module 40 can power different bulbs or light sources 43A, 43B, 43C operating at different frequency by modulation. The synchronization information and metadata for different service providers can operate on different frequency. By having demodulation filter in the platform, these information is unseen by other service providers.

To be sure that the quality of the video streams does not suffer from the VLC information, the QoS controller 60 is included in the video synchronization system 10 to analyze the QoS for the video streams. For the analysis, the QoS controller 60 may use two input sources. One input source is from the receivers 20, where the attributes from the receivers 20 can be collected from the database 50, in which information about RTCP statistics, video quality related values, e.g. frame rate, packet loss rate, bit rate, jitter and delay, are stored. The other input source is from the directors, where MOS score or something like that is sent to the QoS controller 60. The QoS controller 60 uses these key performance indicators (KPIs) to determine when there are deteriorates requiring an adjustment of the VLC pattern and frequency.

Bayesian graphical modeling, see for instance A Brief Introduction to Graphical Models and Bayesian Networks by Kevin Murphy, 1998 (http://www.cs.ubc.ca/~murphyk/Bayes/bnintro.html) and An introduction to graphical models by Kevin Murphy, 2001 (http://www.cs.ubc.ca/~murphyk/Papers/intro_gm.pdf), or other algorithms can be used to decide when to change the VLC pattern and frequency. The algorithm can represent the relationships between the listed variables and abstract out the conditional independence relationships for decision-making.

Thus, in a social multimedia environment, a technology is needed for live delivery of synchronized video streams to the directors watching the distributed live video feeds transmitted over the Internet. The present embodiments introduce a solution that may be implemented as a scalable, cloud-based video synchronization system 10 using VLC to add markers into different video streams. When the stream mixer 70 receives the video streams, the markers can be used as pointers to synchronize video frames of each video stream.

The social event organizer can deploy or upgrade current lighting system with VLC-capable LED lights 43A, 43B, 43C. The LED lights 43A, 43B, 43C can be programmed to flash coded signals in lighting with high-frequency on-off changes. While mobile camera records a social event, the VLC signals are recorded as part of video streams and streamed to the cloud 7 towards the receivers 20. The receivers 20 can detect the VLC signals and compare them with the signal pattern of the LED lights 43A, 43B, 43C. The receivers 20 in the cloud-based network 7 synchronize on the received frames. When operating the lights 43A, 43B, 43C on certain frequency, the rapid flashing is imperceptible to humans. However, in case there is degradation in the quality, the video synchronization system 10 uses a VLC control API to control, for example, the frequency of the VLC signal, the time interval between VLC signals, and/or the time duration of the VLC signals.

The proposed solution may be cloud-based as schematically illustrated in FIG. 10. Thus, the solution can be scaled up or down dynamically as the number of video streams to synchronize grows or decreases in the video synchronization system 10. This guarantees that there are enough processing resources in the video synchronization system 10 to do the video processing and to analyze the quality of the video streams.

The embodiments address problems that intra-frames are out-of-sync in social media environment. Compared to existing solutions mentioned in the background section, using VLC to add markers to video frames for intra-frame synchronization is a reliable and low cost solution, which can provide adequate synchronization for the director(s) to view fully synchronized video streams from multiple sources via different transmission technologies. Besides, the embodiments do not require any additional software or hardware installation or upgrade of the user devices 1, 2, 3.

Embodiments can cope with a large number of users by running the video synchronization system 10 in a cloud environment so that the video synchronization system 10 is able to scale up and down when needed. Media processing of the video streams is distributed so that there is no bottleneck or single point of failure in the video synchronization system 10. It is also possible to distribute the processing even further if the load of the server or processing points or sites goes too high.

These embodiments are not limited to video frame synchronization in social video streaming scenario. The solution can be easily altered to cater professional TV or film production, and the other scenarios, which requires intra-frame synchronization for multiple video sources in a large scale.

Figure 11A:
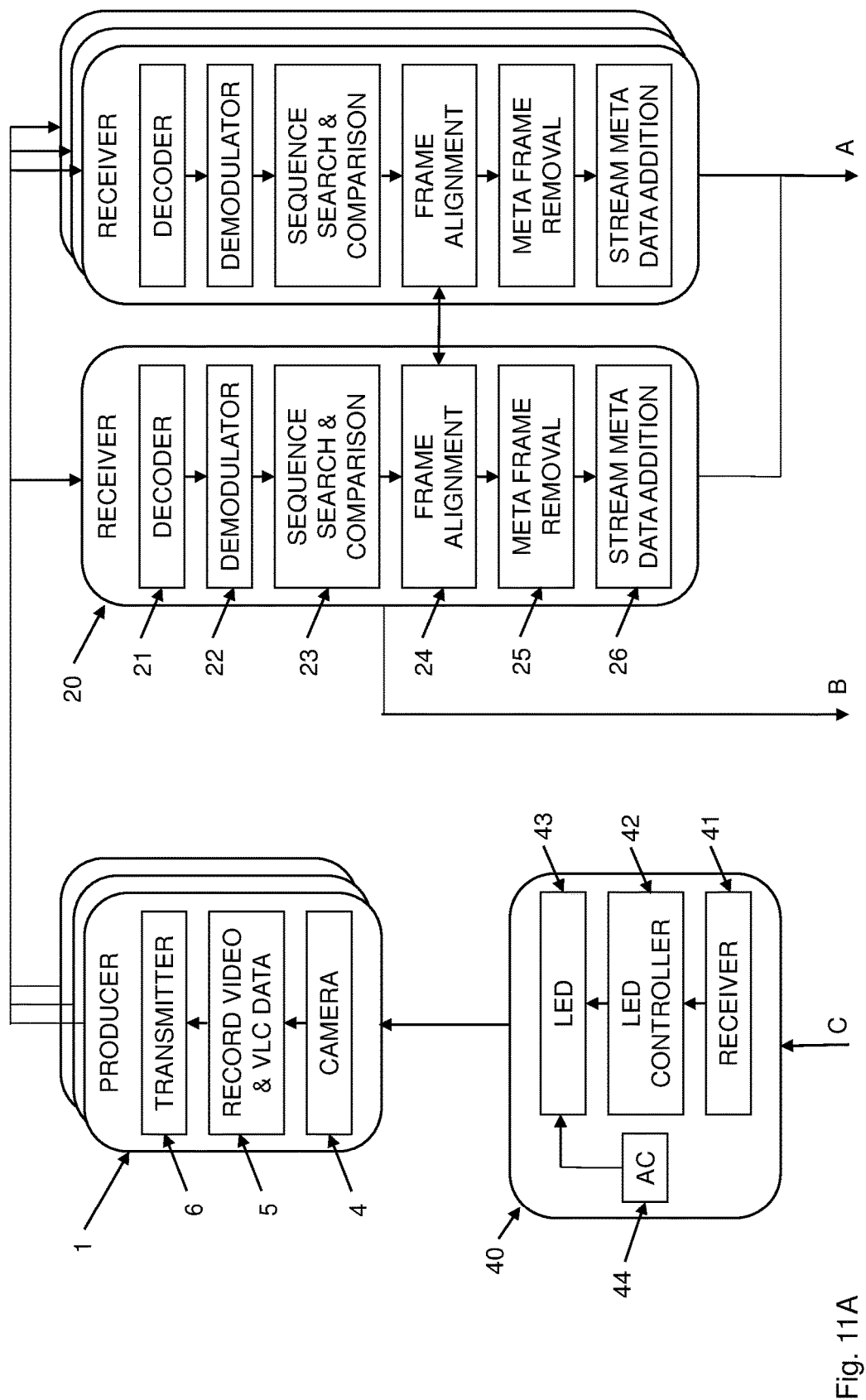
FIGS. 11A and 11B illustrate the operation flow between user devices and the video synchronization system in more detail according to an embodiment.
Figure 11B:
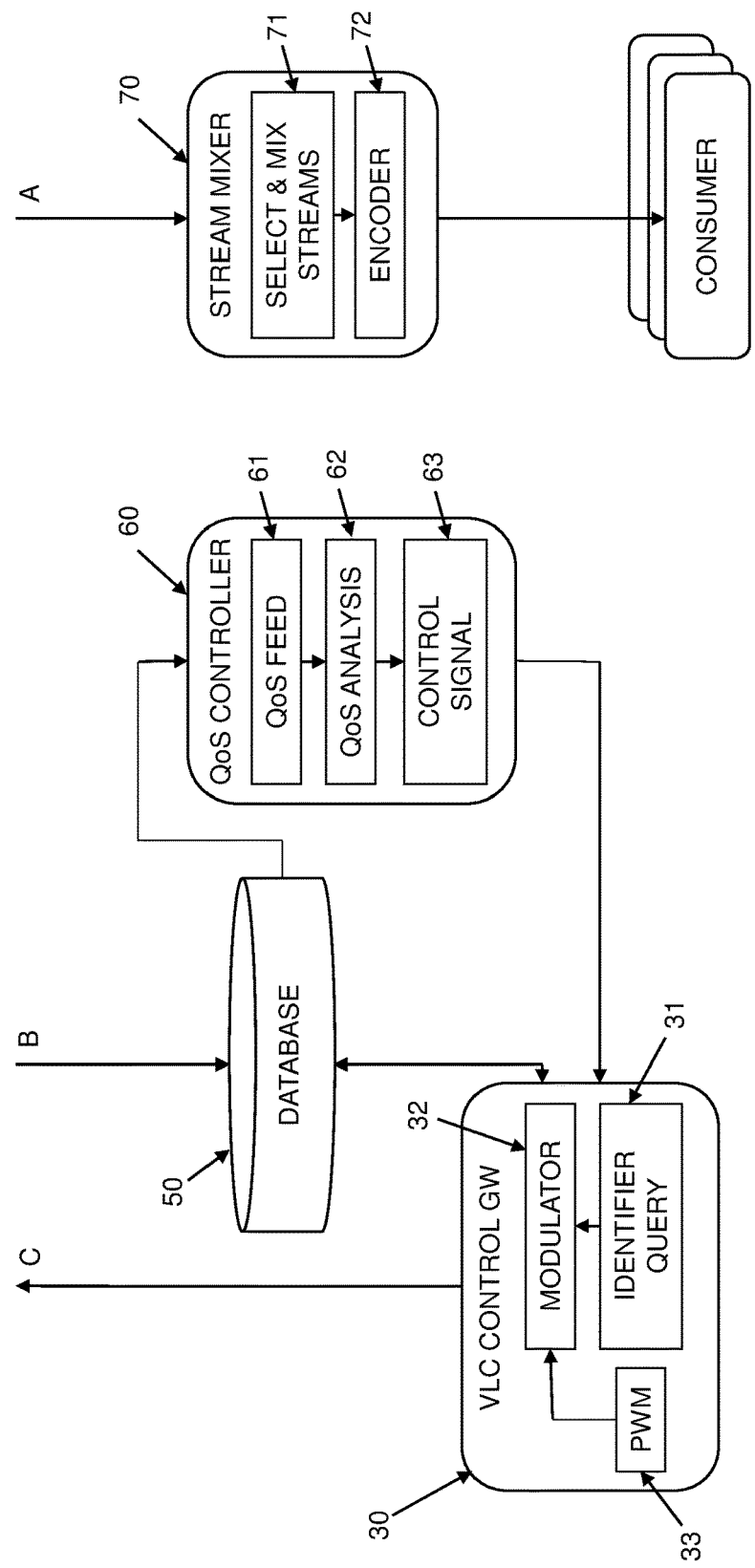

FIGS. 11A and 11B illustrate the operation flow between user devices 1 and a video synchronization system in more detail according to an embodiment. The video synchronization system, which may be cloud-based, comprises the functionality disclosed in FIG. 10, i.e. one or more receivers 20, a VLC control gateway (GW) 30, a power module 40, a database 50, a QoS controller 60 and a stream mixer 70.

The VLC control gateway 30 comprises an identifier query 31 used to retrieve an alignment identifier or sequence number from the database 50. This alignment identifier may a predefined identifier value stored in the database 50. Alternatively, the identifier query 31 generates the identifier value on the fly. A modulator 32 of the VLC control gateway 30 modulates the alignment identifier with a PWM signal from a PWM source 33. The thereby VLC-encoded PWM signal, i.e. light control signal, is transmitted (see arrow C) to the power module 40. There a receiver 41 receives the light control signal. A LED controller 42, operating as light controller, controls a VLC-capable LED 43 to output a VLC signal by flashing the LED 43 on and off at a high frequency according to the light control signal. The power module 40 preferably also comprises an AC electric power supply 44 for the LED 43.

The VLC signal output by the LED 43 is captured by the camera 4 of or connected to a user device 1 while the user records a scene, e.g. at a social event. Video data and VLC data is thereby recorded and encoded into a bitstream by an encoder 5 of the user device 1. The bitstream of encoded video frames is transmitted by a transmitter 6 to one of the receivers 20 of the video synchronization system.

The receiver 20 comprises a decoder 21 employed to decode the encoded video frames to produce the stream of decoded video frames. A demodulator 22 is preferably used to demodulate the light pattern as a part of the decoding process to get the alignment identifier. Alignment identifiers are identified in the different video streams and compared with each other to find matches in a module 23. A frame aligner 24 time aligns video frames from the different user devices 1 based on matches between alignment identifiers.

A removing module 25 may be present to remove meta frames from the video stream. Such meta frames are those video frames that comprise VLC data, such as the light pattern. Additional meta data may be added to the stream by a module 26, such as rich content, subtitles, comments and/or overlays. A further example of meta data may be position information representing positions of the user devices 1 relative to the recorded scene.

The time aligned video streams are forwarded to a stream mixer 70 (see arrow A). A selector and mixer 71 is used to select those video streams that should be mixed to form a combined or mixed video stream. This selection may, for instance, be based on the position information. Video frames of the selected streams are then encoded by an encoder 72 and can be distributed to consumers.

The receiver 20 may additionally extract and forward QoS information relating to the bitstream transmissions, such as in the form of RTCP feedback data. This QoS information is entered into the database 50 (see arrow B).

The QoS controller 60 preferably comprises a QoS feeder 61 configured to fetch QoS parameters from the database 50. The QoS parameters are analyzed by a QoS analyzer 62. The results of the QoS analysis is used to generate a control signal in a signal generator 63 that may be forwarded to the VLC control gateway 30 in order to control modulation and/or generation of the alignment identifier.

Figure 12A:
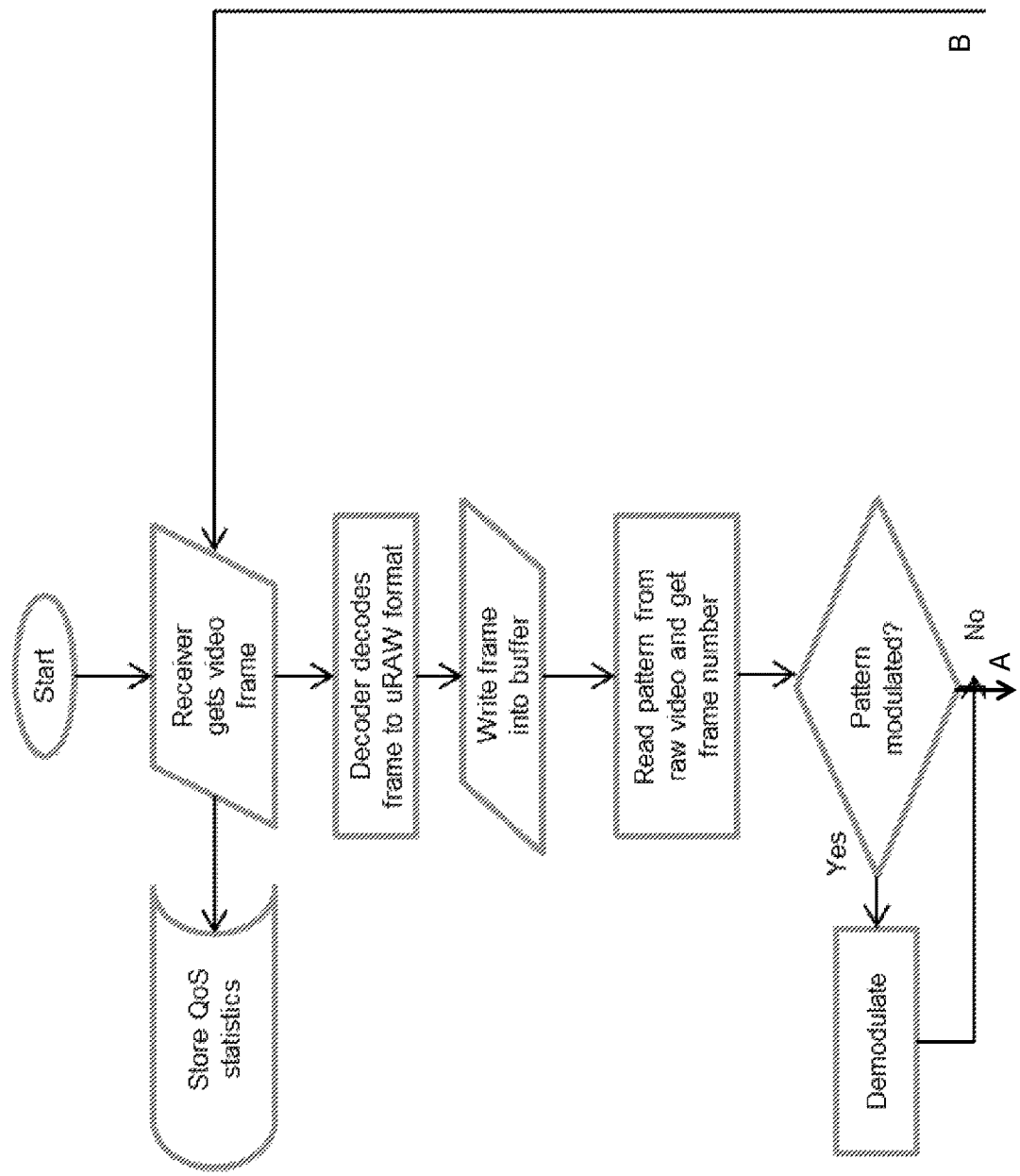
FIGS. 12A and 12B show a flow chart illustrating processing of bitstreams of encoded video frames according to an embodiment.
Figure 12B:
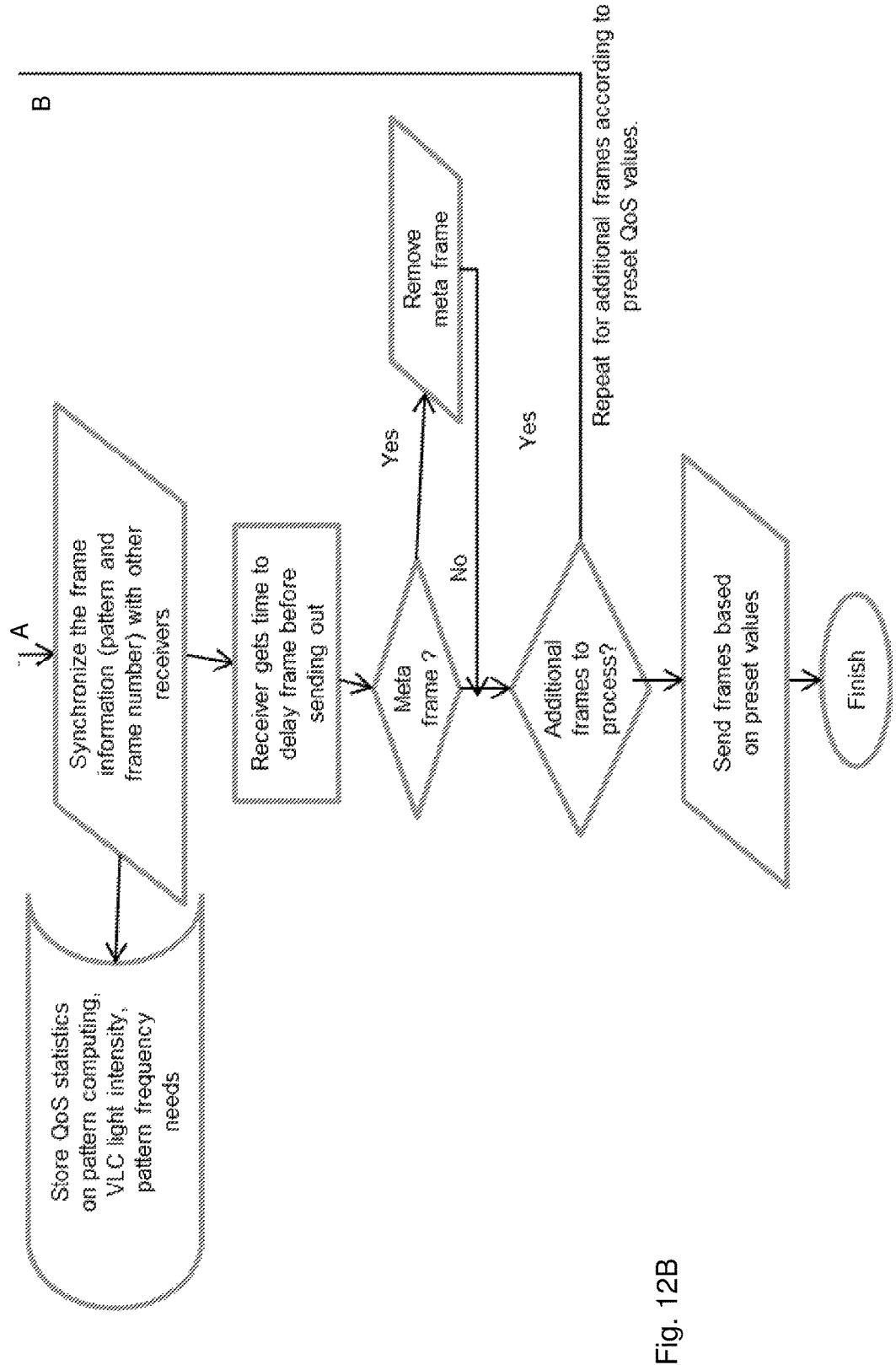

FIGS. 12A and 12B represent a flow diagram illustrating processing of bitstreams of encoded video frames according to an embodiment. The method starts by a receiver receiving a bistream of encoded video frames. The receiver also obtains QoS data that is stored as part of QoS statistics. A decoder decodes the video frames, such as into a raw image format. The decoded video frames are written into and stored in a frame or picture buffer. The light pattern caused by the VLC signal is read from the raw video data optionally together with the frame number(s) of the video frame(s) from which the light pattern is read. If the light pattern is modulated it is demodulated. Frame information is then synchronized with other receivers. Thus, video frames carrying the same light pattern are defined to have the same output time should thereby be time synchronized. The alignment identifiers obtained from the light patterns are used to verify that the relevant video frames from the different user devices are generated at the same period of time. This means that video frame with frame number $f_1$ from which alignment identifier $AD_1$ was obtained and present in video stream number 1 should be time aligned with video frame with frame number $f_2$ from which alignment identifier $AD_1$ was obtained and present in video stream number 2 but not with video frame with frame number $f_3$ from which alignment identifier $AD_2$ was obtained and present in video stream number 3. Hence, frame number $f_1$ from video stream number 1 and frame number $f_2$ from video stream number 2 should be time synchronized.

QoS statistics on the light pattern computation, VLC light intensity, pattern frequency needs, etc. are preferably stored in the database.

The receiver then gets time to delay video frames before sending out them from the frame buffer. The delay is preferably selected so that time synchronized video frames from different streams are output at the same time.

If one or more of the video frames comprise visually disturbing meta data caused by the VLC signal, such a meta frame may be removed. Additional frame processing may be done, such as adding position information.

This procedure is then repeated for additional frames according to preset QoS values that are used to define the time interval between occasions of outputting VLC signals.

The video frames are then sent based on the preset output values to thereby achieve the desired time synchronization.

Figure 13:
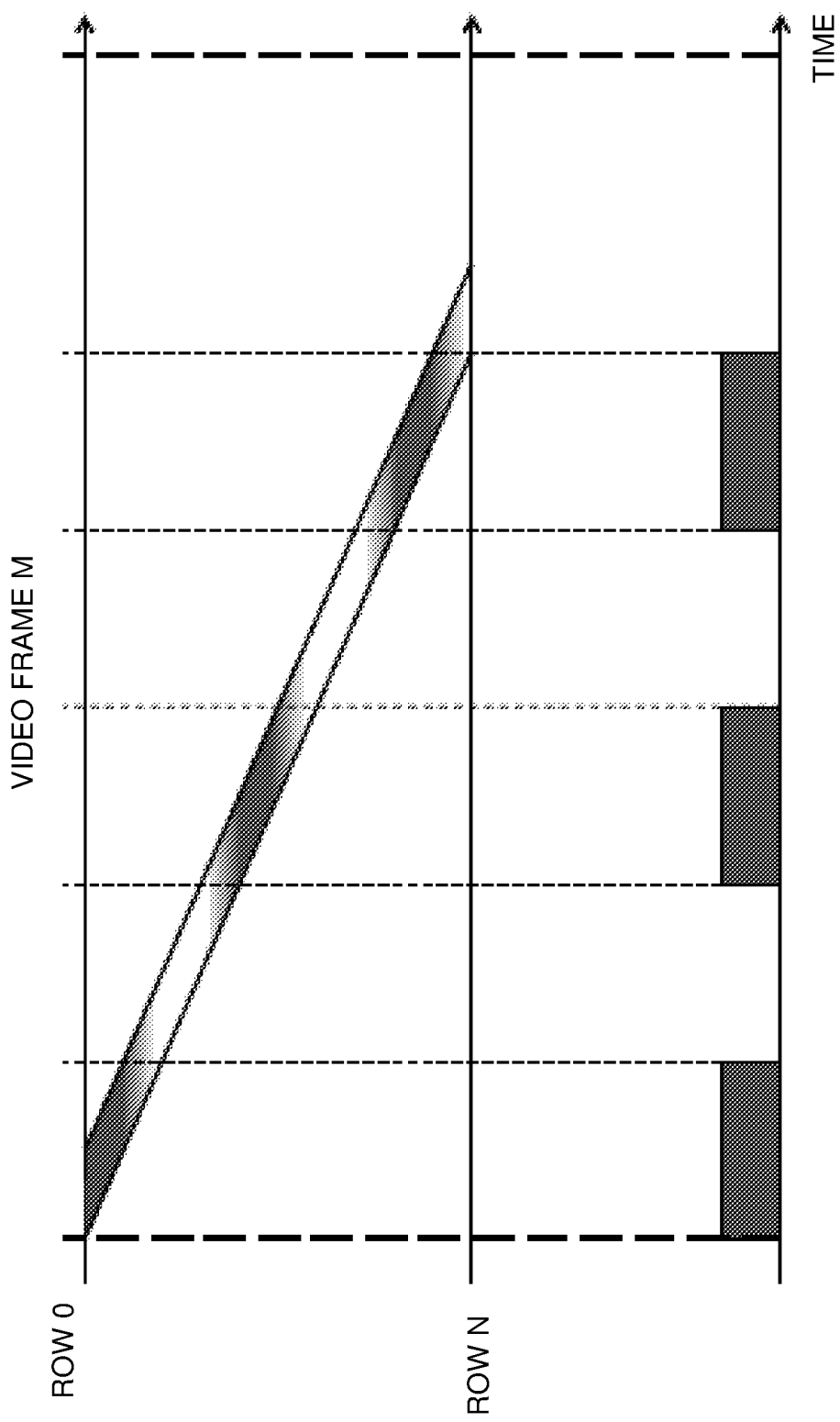
FIG. 13 schematically illustrates an example of a light pattern in a video frame.

FIG. 13 schematically illustrates an example of a light pattern present in a video frame. Many cameras used in smartphones, tables and consumer computer peripherals use complementary metal-oxide-semiconductor (CMOS) sensors and are therefore CMOS rolling shutter cameras. Rolling shutters consecutively expose and read-out individual rows of pixels in a pipelined fashion. As can be seen in FIG. 13 a light source pulsed at a period that is less than the frame duration will produce bright and dark bands coinciding with rows exposed during the on-time and off-time of the light source. The duty-cycle of the light source PWM signal determines the ratio of the height between the bright and dark bands. FIG. 13 illustrates an example with an alignment identifier of $10101_{bin}$, causing the light source to be turned on, off, on, off, on.

Another aspect of the embodiments relates to a video synchronization system. The video synchronization system is configured to modulate an alignment identifier with a modulation signal to get a light control signal. The video synchronization system is also configured to output the light control signal to a light controller connected to a VLC-capable light source and configured to control the VLC-capable light source according to the light control signal to output a VLC signal. The video synchronization system is further configured to receive, from each user device of multiple user devices, a bitstream of encoded video frames representing video data captured by a camera of or connected to the user device. The video synchronization system is additionally configured to decode, for each user device of the multiple user devices, encoded video frames of the bitstream to get a stream of decoded video frames. The video synchronization system is also configured to identify, for each user device of the multiple user devices and in at least one decoded video frame, a light pattern representing a VLC signal captured by the camera of or connected to the user device. The video synchronization system is further configured to decode, for each user device of the multiple user devices, the light pattern into an alignment identifier. The video synchronization system is additionally configured to time align video frames from different user devices among the multiple user devices based on the alignment identifiers.

In an embodiment, the video synchronization system is configured to time align the video frames from the different user devices based on respective values of the alignment identifiers.

In an embodiment, the video synchronization system is configured to assign a same output or playback identifier value to video frames from the different user devices having a same or corresponding value of the alignment identifier.

In an embodiment, the video synchronization system is configured to output video frames from the different user devices having the same or corresponding value of the alignment identifier at the same point in time.

In an embodiment, the video synchronization system is configured to identify at least one decoded video frame comprising the light pattern. The video synchronization system is also configured to remove the identified at least one decoded video frame from the stream of decoded video frames. The video synchronization system is further configured to encode decoded video frames of the stream of decoded frames into encoded video frames.

In an embodiment, the video synchronization system is configured to identify at least one decoded video frame comprising the light pattern. The video synchronization system is also configured to replace the identified at least one decoded video frame with a neighboring decoded video frame lacking the light pattern of the stream of decoded video frames. The video synchronization system is further configured to encode decoded video frames of the stream of decoded frames into encoded video frames.

In an embodiment, the video synchronization system is configured to measure, for each user device of the multiple user devices, a noise floor of transmission of the bitstream. The video synchronization system is also configured to detect, for each user device of the multiple user devices and based on the measurements, a frequency of the light pattern in the image frequency domain. The video synchronization system is further configured to decode, for each user device of the multiple user devices and based on information of the frequency of the light pattern, the light pattern into the alignment identifier.

In an embodiment, the video synchronization system is configured to obtain a QoS parameter representative of a quality of transmission of the bitstream for at least one user device of the multiple user devices. The video synchronization system is also configured to control modulation of the alignment identifier and/or generation of the alignment identifier based on a value of the QoS parameter.

In an embodiment, the video synchronization system is configured to obtain a quality score representative of a quality of video data of the bitstream for at least one user device of the multiple user devices. The video synchronization system is also configured to control modulation of the alignment identifier and/or generation of the alignment identifier based on the quality score.

In a particular embodiment, the video synchronization system is configured to increase time interval between occasions of modulating the alignment identifier if a value of the QoS parameter represents a worse QoS than a defined minimum QoS or if a value of the quality score represents a worse quality than a defined minimum quality.

In another particular embodiment, the video synchronization system is configured to decrease time intervals between occasions of modulating the alignment identifier if a value of the QoS parameter represents a better QoS than a defined QoS or if a value of the quality score represents a better quality than a defined minimum quality.

In a further particular embodiment, the video synchronization system is configured to generate an alignment identifier resulting in a reduction of a duration of the VLC signal if a value of the QoS parameter represents a worse QoS than a defined minimum QoS or if a value of the quality score represents a worse quality than a defined minimum quality. A reduction of the length of the VLC signal thereby corresponds to a reduction in duration of the VLC signal.

In an embodiment, the video synchronization system is configured to provide i) a first alignment identifier comprising an optional preamble symbol followed by an optional pilot symbol and a first sequence number and ii) a second alignment identifier comprising the optional preamble followed by the optional pilot symbol and a second, different sequence number. The video synchronization system is also configured to modulate i) the first alignment identifier with the modulation signal to get a first light control signal and ii) the second alignment identifier with the modulation signal to get a second light control signal. The video synchronization system is further configured to output i) the first light control signal to a light controller connected to a first VLC-capable light source and configured to control the first VLC-capable light source according to the first light control signal to output a first VLC signal and ii) the second light control signal to a light controller connected to a second VLC-capable light source and configured to control the second VLC-capable light source according to the second light control signal to output a second VLC signal. The video synchronization system is additionally configured to select, based on the first alignment identifier and the second alignment identifier, user devices among the multiple user devices outputting bitstreams carrying at least one encoded video frame with a light pattern representing the first VLC signal. The video synchronization system is also configured to time align video frames from the selected user devices.

The video synchronization system could be a backend server capable of communicating with user devices. The video synchronization system could alternatively be implemented as a group or cluster of multiple, i.e. at least two, backend servers that are interconnected by wired or wireless connections. The multiple backend servers could be locally arranged at the video synchronization service provider or be distributed among multiple locations. Also cloud-based implementations of the video synchronization system are possible and within the scope of the embodiments.

It will be appreciated that the methods and systems described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 14:
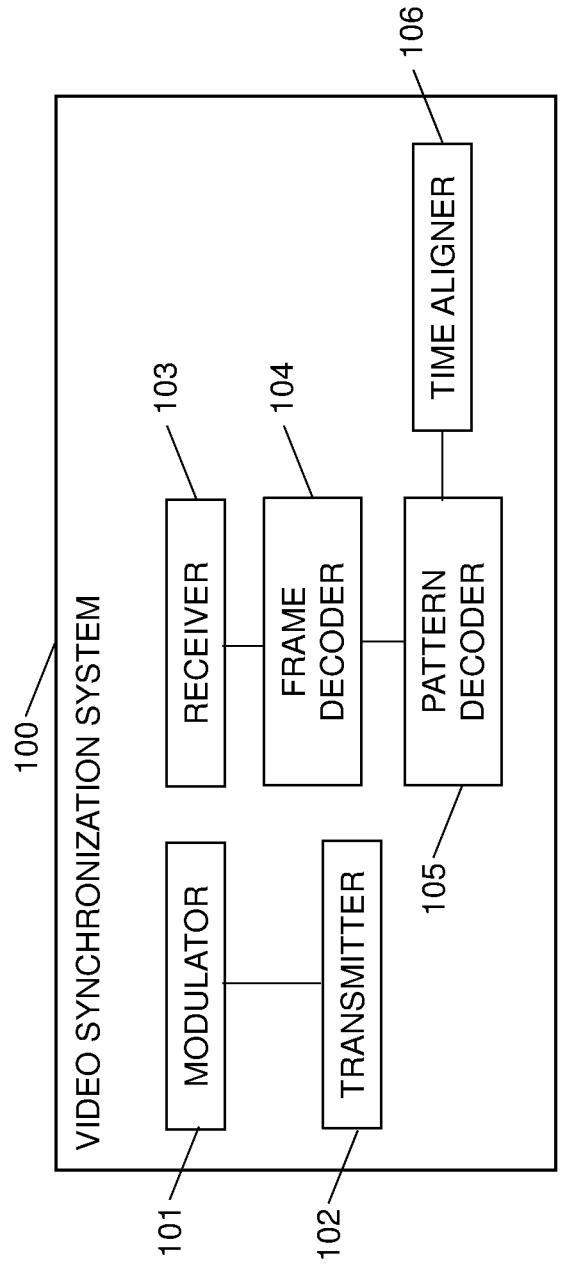
FIG. 14 schematically illustrates a block diagram of a video synchronization server system according to an embodiment.

FIG. 14 illustrates a particular hardware implementation of the video synchronization system 100. In an embodiment, the video synchronization system 100 comprises a modulator 101 configured to modulate the alignment identifier with the modulation signal. The video synchronization system 100 also comprises a transmitter 102 configured to output the light control signal to the light controller. The video synchronization system 100 further comprises a receiver 103 configured to receive the bitstream from each user device of the multiple user devices. A frame decoder 104 of the video synchronization system 100 is configured to decode the encoded video frames for each user device of the multiple user devices and a pattern decoder 105 is configured to decode the light pattern for each user device of the multiple user devices. The video synchronization system 100 additionally comprises a time aligner 106 configured to time align the video frames from the different user devices based on the alignment identifiers.

The modulator 101 is preferably connected to the transmitter 102 to forward the light control signal thereto. The receiver 103 is preferably connected to the frame decoder 104 to forward the encoded video frames of the bitstreams to the frame decoder 104. The frame decoder 104 is in turn connected to the pattern decoder 105 in order to forward the decoded video frames thereto. The pattern decoder 105 is connected to the time alignment 106 in order to transmit information of the alignment identifiers thereto.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 15:
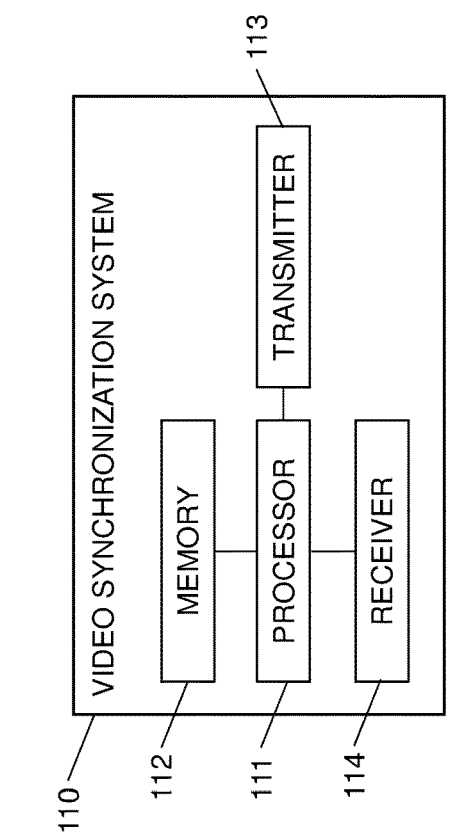
FIG. 15 schematically illustrates a block diagram of a video synchronization server system according to another embodiment.

In a particular example, the video synchronization system 110, see FIG. 15, comprises a processor 111 and a memory 112 comprising instructions executable by the processor 111. The processor 111 is operative to modulate the alignment modifier with the modulation signal. The processor 111 is also operative to output the light control signal for transmission to the light controller. The processor 111 is further operative to decode the encoded video frames for each user device of the multiple user devices. The processor 111 is additionally operative to decode the light pattern for each user device of the multiple user device. The processor 111 is also operative to time align the video frames from the different user devices based on the alignment identifiers.

In a particular embodiment, the processor 111 is operative, when executing the instructions stored in the memory 112, to perform the above described operations. The processor 111 is thereby interconnected to the memory 112 to enable normal software execution.

The video synchronization system 110 may furthermore comprise a transmitter 113 configured to transmit the light control signal to the light controller and a receiver 114 configured to receive the bitstream from the user devices.

Figure 17:
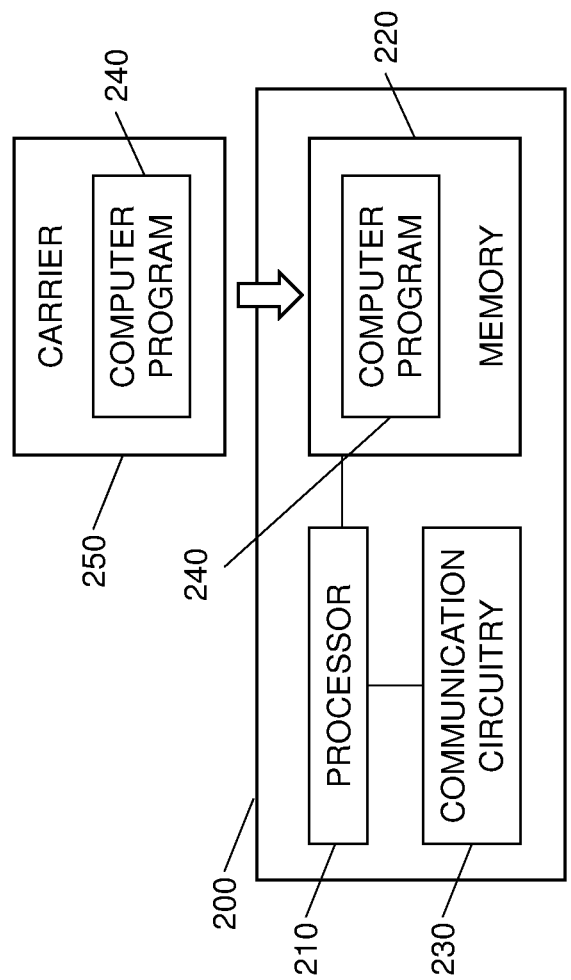
FIG. 17 schematically illustrates a computer program implementation according to an embodiment.

FIG. 17 is, in an embodiment, a schematic block diagram illustrating an example of a video synchronization system 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of the light control signals and the bitstreams.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to modulate an alignment identifier with a modulation signal to get a light control signal. The processor 210 is also caused to output the light control signal for transmission to a light controller connected to a VLC-capable light source and configured to control the VLC-capable light source according to the light control signal to output a VLC signal. The processor 210 is further caused to decode, for each user device of multiple user devices, encoded video frames of a bitstream received from the user device to get a stream of decoded video frames. The bitstream comprises encoded video frames representing video data captured by a camera of or connected to the user device. The processor 210 is additionally caused to identify, for each user device of the multiple user devices and in at least one decoded video frame, a light pattern representing a VLC signal captured by the camera of or connected to the user device. The processor 210 is also caused to decode, for each user device of the multiple user devices, the light pattern into an alignment identifier. The processor 210 is further caused to time align video frames from different user devices among the multiple user devices based on the alignment identifiers.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 250, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a computer or equivalent processing device, represented by the video synchronization system 200 in FIG. 17, for execution by the processor 210 thereof.

The flow diagram or diagrams presented herein may therefore be regarded as a computer flow diagram or diagrams, when performed by one or more processors. A corresponding video synchronization system may be defined as a group of function modules, where each step performed by the processor corresponds to a function module. In this case, the function modules are implemented as a computer program running on the processor. Hence, the video synchronization system may alternatively be defined as a group of function modules, where the function modules are implemented as a computer program running on at least one processor.

Figure 16:
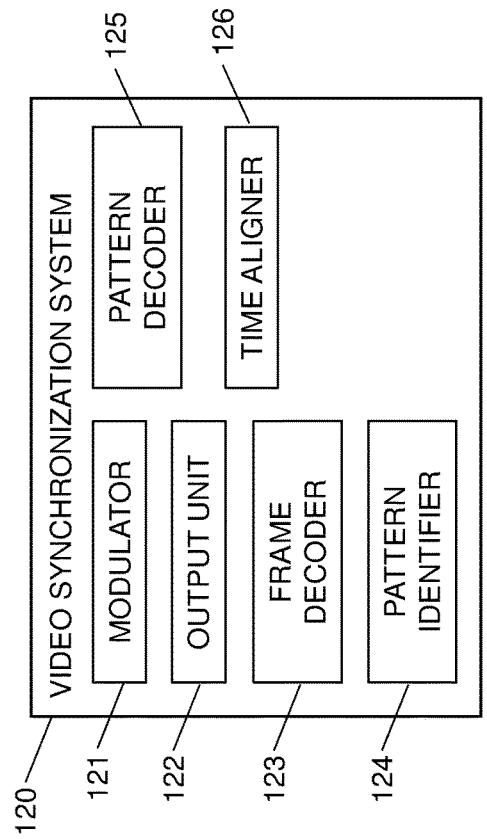
FIG. 16 schematically illustrates a block diagram of a video synchronization server system according to a further embodiment.

The computer program residing in memory may thus be organized as appropriate function modules configured to perform, when executed by the processor, at least part of the steps and/or tasks described herein. An example of such function modules is illustrated in FIG. 16 illustrating a schematic block diagram of a video synchronization system 120 with function modules. The video synchronization system 120 comprises a modulator 121 for modulating an alignment identifier with a modulation signal to get a light control signal. The video synchronization system 120 also comprises an output unit 122 for outputting the light control signal for transmission to a light controller connected to a VLC-capable light source and configured to control the VLC-capable light source according to the light control signal to output a VLC signal. The video synchronization system 120 further comprises a frame decoder 123 for decoding, for each user device of multiple user devices, encoded video frames of a bitstream received from the user device to get a stream of decoded video frames. The bitstream comprises encoded video frames representing video data captured by a camera of or connected to the user device. The video synchronization system 120 additionally comprises a pattern identifier 124 for identifying, for each user device of the multiple user devices and in at least one decoded video frame, a light pattern representing a VLC signal captured by the camera of or connected to the user device. The video synchronization system 120 also comprises a pattern decoder 125 for decoding, for each user device of the multiple user devices, the light pattern into an alignment identifier. The video synchronization system 120 further comprises a time aligner 126 for time aligning video frames from different user devices among the multiple user devices based on the alignment identifiers.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A video synchronization method comprising:
modulating an alignment identifier with a modulation signal to get a light control signal;
outputting said light control signal to a light controller connected to a visible light communication, VLC, capable light source and configured to control said VLC-capable light source according to said light control signal to output a VLC signal;
receiving, from each user device of multiple user devices, a bitstream of encoded video frames representing video data captured by a camera of or connected to said user device;
decoding, for each user device of said multiple user devices, encoded video frames of said bitstream to get a stream of decoded video frames;
identifying, for each user device of said multiple user devices and in at least one decoded video frame of said stream of decoded video frames, a light pattern representing a VLC signal captured by said camera of or connected to said user device;
decoding, for each user device of said multiple user device, said light pattern into an alignment identifier; and
time aligning video frames from different user devices among said multiple user devices based on said alignment identifiers.

2. The video synchronization method according to claim 1, wherein time aligning said video frames comprises time aligning said video frames from said different user devices based on respective values of said alignment identifiers.

3. The video synchronization method according to claim 2, wherein time aligning said video frames comprises assigning the same output or playback identifier value to video frames from said different user devices having the same or corresponding value of said alignment identifier.

4. The video synchronization method according to claim 2, wherein time aligning said video frames comprises outputting video frames from said different user devices having the same or corresponding value of said alignment identifier at the same point in time.

5. A video synchronization system, wherein said video synchronization system is configured to:
modulate an alignment identifier with a modulation signal to get a light control signal;
output said light control signal to a light controller connected to a visible light communication, VLC, capable light source and configured to control said VLC-capable light source according to said light control signal to output a VLC signal;
receive, from each user device of multiple user devices, a bitstream of encoded video frames representing video data captured by a camera of or connected to said user device;
decode, for each user device of said multiple user devices, encoded video frames of said bitstream to get a stream of decoded video frames;
identify, for each user device of said multiple user devices and in at least one decoded video frame of said stream of decoded video frames, a light pattern representing a VLC signal captured by said camera of or connected to said user device;
decode, for each user device of said multiple user device, said light pattern into an alignment identifier; and
time align video frames from different user devices among said multiple user devices based on said alignment identifiers.

6. The video synchronization system according to claim 5, wherein said video synchronization system is configured to time align said video frames from said different user devices based on respective values of said alignment identifiers.

7. The video synchronization system according to claim 6, wherein said video synchronization system is configured to assign the same output or playback identifier value to video frames from said different user devices having the same or corresponding value of said alignment identifier.

8. The video synchronization system according to claim 6, wherein said video synchronization system is configured to output video frames from said different user devices having the same or corresponding value of said alignment identifier at the same point in time.

9. The video synchronization system according to claim 5, wherein
said video synchronization system is configured to identify at least one decoded video frame comprising said light pattern;
said video synchronization system is configured to remove said identified at least one decoded video frame from said stream of decoded video frames; and
said video synchronization system is configured to encode decoded video frames of said stream of decoded video frames into encoded video frames.

10. The video synchronization system according to claim 5, wherein
said video synchronization system is configured to identify at least one decoded video frame comprising said light pattern;
said video synchronization system is configured to replace said identified at least one decoded video frame with a neighboring decoded video frame lacking said light pattern of said stream of decoded video frames; and
said video synchronization system is configured to encode decoded video frames of said stream of decoded video frames into encoded video frames.

11. The video synchronization system according to claim 5, wherein
said video synchronization system is configured to measure, for each user device of said multiple user devices, a noise floor of transmission of said bitstream;
said video synchronization system is configured to detect, for each user device of said multiple user devices and based on said measurements, a frequency of said light pattern in the image frequency domain; and
said video synchronization system is configured to decode, for each user device of said multiple user devices and based on information of said frequency of said light pattern, said light pattern into said alignment identifier.

12. The video synchronization system according to claim 5, wherein
said video synchronization system is configured to obtain a quality of service, QoS, parameter representative of a quality of transmission of said bitstream for at least one user device of said multiple user devices; and
said video synchronization system is configured to control modulation of said alignment identifier and/or generation of said alignment identifier based on a value of said QoS parameter.

13. The video synchronization system according to claim 12, wherein said video synchronization system is configured to increase time intervals between occasions of modulating said alignment identifier if a value of said QoS parameter represents a worse QoS than a defined minimum QoS or if a value of said quality score represents a worse quality than a defined minimum quality.

14. The video synchronization system according to claim 12, wherein said video synchronization system is configured to decrease time intervals between occasions of modulating said alignment identifier if a value of said QoS parameter represents a better QoS than a defined QoS or if a value of said quality score represents a better quality than a defined minimum quality.

15. The video synchronization system according to claim 12, wherein said video synchronization system is configured to generate an alignment identifier resulting in a reduction of a duration of said VLC signal if a value of said QoS parameter represents a worse QoS than a defined minimum QoS or if a value of said quality score represents a worse quality than a defined minimum quality.

16. The video synchronization system according to claim 5, wherein
said video synchronization system is configured to obtain a quality score representative of a quality of video data of said bitstream for at least one user device of said multiple user devices; and
said video synchronization system is configured to control modulation of said alignment identifier and/or generation of said alignment identifier based on said quality score.

17. The video synchronization system according to claim 5, wherein
said video synchronization system is configured to provide i) a first alignment identifier comprising an optional preamble symbol followed by an optional pilot symbol and a first sequence number and ii) a second alignment identifier comprising said optional preamble followed by said optional pilot symbol and a second, different sequence number;
said video synchronization system is configured to modulate i) said first alignment identifier with said modulation signal to get a first light control signal and ii) said second alignment identifier with said modulation signal to get a second light control signal;
said video synchronization system is configured to output i) said first light control signal to a light controller connected to a first VCL-capable light source and configured to control said first VLC-capable light source according to said first light control signal to output a first VLC signal and ii) said second light control signal to a light controller connected to a second VCL-capable light source and configured to control said second VLC-capable light source according to said second light control signal to output a second VLC signal;
said video synchronization system is configured to select, based on said first alignment identifier and said second alignment identifier, user devices among said multiple user devices outputting bitstreams carrying at least one encoded video frame with a light pattern representing said first VLC signal; and
said video synchronization system is configured to time align video frames from said selected user devices.

18. The video synchronization system according to claim 5, comprising:
a modulator configured to modulate said alignment identifier with said modulation signal;
a transmitter to output said light control signal to said light controller;
a receiver configured to receive said bitstream from each user device of said multiple user devices;
a frame decoder configured to decode said encoded video frames for each user device of said multiple user devices;
a pattern decoder configured to decode said light pattern for each user device of said multiple user device; and a time aligner configured to time align said video frames from said different user devices based on said alignment identifiers.

19. The video synchronization system according to claim 5, comprising:
a processor; and
a memory comprising instructions executable by said processor, wherein
said processor is operative to modulate said alignment identifier with said modulation signal;
said processor is operative to output said light control signal for transmission to said light controller;
said processor is configured to decode said encoded video frames for each user device of said multiple user devices;
said processor is operative to decode said light pattern for each user device of said multiple user device; and
said processor is operative to time align said video frames from said different user devices based on said alignment identifiers.

20. A computer program product comprising a non-transitory computer readable medium storing a computer program comprising instructions, which when executed by a processor, cause said processor to
modulate an alignment identifier with a modulation signal to get a light control signal;
output said light control signal for transmission to a light controller connected to a visible light communication, VLC, capable light source and configured to control said VLC-capable light source according to said light control signal to output a VLC signal;
decode, for each user device of multiple user devices, encoded video frames of a bitstream received from said user device to get a stream of decoded video frames, said bitstream comprises encoded video frames representing video data captured by a camera of or connected to said user device;
identify, for each user device of said multiple user devices and in at least one decoded video frame of said stream of decoded video frames, a light pattern representing a VLC signal captured by said camera of or connected to said user device;
decode, for each user device of said multiple user device, said light pattern into an alignment identifier; and
time align video frames from different user devices among said multiple user devices based on said alignment identifiers.

\* \* \* \* \*